US008895641B2

(12) United States Patent
Vaidya et al.

(10) Patent No.: US 8,895,641 B2
(45) Date of Patent: Nov. 25, 2014

(54) SULFUR MODIFIED ASPHALT FOR WARM MIX APPLICATIONS

(71) Applicants: Saudi Arabian Oil Company, Dhahran (SA); PRI Asphalt Technologies, Inc., Tampa, FL (US)

(72) Inventors: Milind M. Vaidya, Dhahran (SA); Anwar H. Khawajah, Dammam (SA); Rashid M. Othman, Khobar (SA); Laurand Lewandowski, Tampa, FL (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/228,998

(22) Filed: Mar. 28, 2014

(65) Prior Publication Data

US 2014/0213699 A1    Jul. 31, 2014

Related U.S. Application Data

(62) Division of application No. 12/938,984, filed on Nov. 3, 2010, now Pat. No. 8,722,771.

(51) Int. Cl.
*C04B 24/26*    (2006.01)
*C08K 3/32*     (2006.01)

(52) U.S. Cl.
USPC .......... 524/2; 524/5; 524/8; 524/417; 524/59; 524/69; 524/121

(58) Field of Classification Search
USPC .................. 524/2, 5, 8, 59, 69, 121, 417
See application file for complete search history.

(56) References Cited

U.S. PATENT DOCUMENTS

| | | | |
|---|---|---|---|
| 2,299,469 | A | 10/1942 | D'Antal |
| 5,494,966 | A | 2/1996 | Hesp et al. |
| 7,297,204 | B2 | 11/2007 | Crews et al. |
| 7,902,277 | B2 | 3/2011 | Reinke et al. |
| 2006/0089429 | A1 | 4/2006 | Buras et al. |
| 2007/0027261 | A1 | 2/2007 | Prejean et al. |
| 2007/0287778 | A1* | 12/2007 | Martin ............. 524/59 |
| 2008/0060551 | A1 | 3/2008 | Crews et al. |
| 2008/0153945 | A1 | 6/2008 | Prejean et al. |
| 2008/0194738 | A1 | 8/2008 | Crews et al. |
| 2008/0200611 | A1 | 8/2008 | Prejean et al. |
| 2009/0068348 | A1 | 3/2009 | Reinke et al. |
| 2009/0194002 | A1 | 8/2009 | Maldonado et al. |
| 2009/0215931 | A1* | 8/2009 | Reinke et al. ........ 524/69 |
| 2010/0056669 | A1 | 3/2010 | Bailey |
| 2011/0196073 | A1 | 8/2011 | Fee et al. |

FOREIGN PATENT DOCUMENTS

| | | | |
|---|---|---|---|
| WO | 2001090250 | A1 | 11/2001 |
| WO | 2006107907 | A1 | 10/2006 |
| WO | 2008132151 | A1 | 11/2008 |
| WO | 2009033060 | A1 | 3/2009 |
| WO | 2009105688 | A1 | 8/2009 |

OTHER PUBLICATIONS

"Asphalt Modifier-Elvaloy RET," E.I. du Pont de Memours and Company, 2012, p. 1, Retrieved from the Internet: http://www2.dupont.com/Asphalt_Modifier/en_US/index.html [retrieved on Feb. 3, 2012].
"Build Safer, longer-lasting pavements that fight extreme temperatures and traffic loads," http://www.dupont.com/asphalt/, Jul. 20, 2006, 3 pages, DuPont Industrial Polymers, Wilmington, DE.
"Dupont Elvaloy Research Report," Mathy Technology & Engineering Services, Inc., Oct. 16, 2001, 38 pages, Retrieved from the Internet: http://www2.dupont.com/Asphalt_Modifer/en_US/assets/downloads/Citgo-RET-vs-SBS-Mathy.pdf [retrieved on Feb. 3, 2012].
J. Craswell et al "Dynamic shear Rheometers," Dec. 29, 2004, 9 pages, Retrieved from the Internet: http://www2.dupont.com/Asphalt_Modifier/en_US/assets/downloads/Citgo-RET-vs-SBS-Mathy.pdf [retrieved on Feb. 2, 2012].
Y. Edwards et al. "Rheological effects of commercial waxes and polyphosphoric acid in bitumen 160/220—high and medium temperature performance," Construction and Building Materials, 2007, 10 pages.
Y. Edwards et al. "Rheological effects of commercial waxes and polyphosphoric acid in bitumen 160/220—low temperature performance," Fuel, 2006, 9 pages.
Graham C. Hurley et al. "Evaluation of Sasobit for Use in Warm Mix Asphalt," National Center for Asphalt Technology, Jun. 2005, NCAT Report 05-06, 32 pages.
Hailong Jin, et al., "Improved properties of polystyrene-modified asphalt through dynamic vulcanization," Polymer Testing, 2002, 8 pages.
Jeff A. Jirak et al. "Road Evaluation Report," DuPont Elvaloy reactive elastomeric terpolymer (RET), Oct. 14, 2000, 9 pages, DuPont Industrial Polymers, Wilmington, DE.
J.F. Masson, "Brief Review of the Chemistry of Polyphosphoric Acid (PPA) and Bitumen," Energy & Fuels, vol. 22, 2008, 4 pages.
Junaid Saleem, Sulfur Modification of Polymers for Use in Asphalt Binders, Jun. 1, 2008, 55 pages.
Junaid Saleem, "Sulfur Modification of Polymers for Use in Asphalt Binders," A Thesis Presented to the Deanship of Graduate Studies, King Fahd University of Petroleum and Minerals, Jun. 2008, 65 pages.
David Timm, et al. "Evaluation of Mixture Performance and Structural Capacity of Pavements Using Shell Thiopave," National Center for Asphalt Technology at Auburn University, Aug. 2009, 44 pages, NCAT Report 09-05.
G.C. Hurley et al. "Evaluation of Aspha-Min Zeolite for Use in Warm Mix Asphalt," NCAT Report 05-04, Jun. 2005, National Center for Asphalt Technology Auburn University, 35 pages.
"Warm Mix Asphalt Shows Promise for Cost Reduction, Environmental Benefits," The Asphalt Pavement Associations of Oregon, Inc. (APAO), Fall 2003, 1 page.

(Continued)

*Primary Examiner* — Robert D. Harlan
(74) *Attorney, Agent, or Firm* — Bracewell & Giuliani LLP; Constance G. Rhebergen; James M. Sellers

(57) ABSTRACT

Disclosed herein are an asphalt concrete mixture, an asphalt binder composition, and methods of preparing the related compositions. The asphalt binder compositions include a polyphosphoric acid, a macromolecular polymer having a saturated backbone with macromolecular modifications, sulfur, and non-surfactant additives based on wax chemistry. The compositions are capable of being performance graded and being used in warm mix asphalt applications.

27 Claims, 2 Drawing Sheets

(56) References Cited

OTHER PUBLICATIONS

T. Hampton, "U.S. Studies 'Warm-Mix' Asphalt Methods: NAPA, European Producers to Sponsor Laboratory-Research Effort," http://enr.construciton.com/products/newproducts/archives/030428.asp, Accessed Aug. 30, 2005, 4 pages.

"Warm Mix Technologies and Research," U.S. Department of Transportation Federal Highway Administration, http://www.fhwa.dot.gov/pavements/wma.html, Accessed Feb. 17, 2004, 7 pages.

Z. Zhou et al. "Producing Fuels from Fischer-Tropsch Waxes," Petrochemicals and Gas Processing, pp. 137-143, Winter 2004, 5 pages.

T. Butz et al. "Modifications of Road Bitumens with the Fischer-Tropsch Paraffin Sasobit," Journal of Applied Asphalt Binder Technology, Oct. 2001, pp. 70-86, Sasol International, "What is Sasobit?" http:??www.sasolwax.com. Accessed Jan. 14, 2005.

C.H. Brits, Sasobit Investigation Report No. 100035/S9/2004/11/05/CHB/av/1, Geostrada Engineering Materials Laboratory, South Africa, 2004, Sasol Wax, "Roads and Trials with Sasobit," http://www.sasolwax.com/data/sasolwax_/Bitumen%20Modification, Accessed May 13, 2005.

International Search Report issued in related International Patent Application No. PCT/US2011/059108; dated May 7, 2013; 11 pages.

* cited by examiner

SULFUR MODIFIED ASPHALT FOR WARM MIX APPLICATIONS

CROSS-REFERENCE TO RELATED PATENT APPLICATIONS

This application is a divisional application and claims priority from U.S. Non-provisional patent application Ser. No. 12/938,984, filed Nov. 3, 2010. For purposes of United States patent practice, this application incorporates the contents of the Non-provisional Application by reference in its entirety.

FIELD OF THE INVENTION

Disclosed herein are an asphalt concrete mixture, an asphalt binder composition, and methods of preparing the asphalt concrete mixture.

BACKGROUND OF THE INVENTION

As modern commerce depends on reliable and cost-effective methods for delivering products from suppliers to users, the availability of durable and reliable highways, roads and other support surfaces for vehicles is vital for sustaining a modern economy. To provide better support surfaces, highways, roads, and sidewalks are commonly paved with a layer or mat of asphalt concrete that is laid over the surface of the sub-base. Asphalt is preferred over Portland Concrete cement to paved roads because it is less expensive and very durable.

Asphalts are essentially mixtures of bitumen, as binder, with aggregate, in particular mineral filler, fine aggregates, and coarse aggregates. There are many different types of asphalts available and their characteristics can vary quite significantly. The design of asphalts for bituminous paving application is a complex process of selecting and proportioning materials to obtain the desired properties in the finished construction while minimize undesirable characteristics.

In evaluating and adjusting mix designs, the aggregate gradation and the binder content in the final mix design are balanced between the stability and durability requirements for the intended use. The final goal of mix design is to achieve a balance among all of the desired properties. Binders and various polymers have been investigated for reaching similar goals, and other modifications have been studied.

Unsaturated thermoplastic elastomers like styrene-butadiene-styrene (SBS) block copolymers, linear copolymers, diblock copolymers and radial copolymers are polymers used for asphalt modification. They enhance the elastic recovery capacities of asphalt and, therefore, its resistance to permanent deformations. However, unsaturated elastomeric polymers are quite expensive and are subjected to degradation when exposed to atmospheric agents and mechanical stress. This can result in a significant cost increase for the product. While SBS is recognized for performance benefits, research has focused on most cost effective modifiers in exchange for sacrificing superior performance.

Olefinic polymers have been investigated for use as modifiers. They are available in large quantities with different mechanical properties and at low cost. Polyethylene (PE) and polypropylene (PP) are plastomers. They bring a high rigidity (i.e., lack of elasticity, resistance to bending) to the product and significantly reduce deformations under traffic load. Due to their non-polar nature, PE and PP suffer from the drawback that they are almost completely immiscible with asphalt, and are thus limited in use.

Conventional asphalts often do not retain sufficient elasticity in use and, also, exhibit a plasticity range that is too narrow for use in many modern applications such as road construction. The characteristics of road asphalts can be improved by incorporating into them an elastomeric-type polymer. There exists a wide variety of polymers that can be mixed with asphalt. Of these, SBS is a commonly used polymer in asphalt modification. The modified asphalts thus obtained commonly are referred to variously as bitumen/polymer binders or asphalt/polymer mixes. There is a need for a modification to hot mix asphalt concrete mixes that would increase the resistance to permanent deformation while maintaining or decreasing the modulus of the mix at intermediate temperatures without affecting the binder properties significantly.

The bituminous binders, even of the bitumen/polymer type, which are employed at the present time in road applications often, do not have the optimum characteristics at low enough polymer concentrations to consistently meet the increasing structural and workability requirements imposed on roadway structures and their construction. In order to achieve a given level of modified asphalt performance, various polymers are added at some prescribed concentration. Current practice is to add the desired level of a single polymer, sometimes along with a reactant that promotes cross-linking of the polymer molecules for compatibility until the desired asphalt properties are met. This reactant typically is sulfur in a form suitable for reacting.

Numerous approaches have been used to incorporate sulfur as a crosslinking agent into asphalt compositions in the past. Typically the loadings are from about 0 wt. % to about 5 wt. % of the polymer. For non-crosslinking application, typically approaches have been to add between 5-70 wt. % sulfur into asphalt and non-asphalt based binders to perform in asphalt pavement applications.

When added to bitumen at 140° C., sulfur is finely dispersed in bitumen as uniformly small particles; coagulation and settlement of sulfur particles become noticeable after a few hours. Therefore, the sulfur extended asphalt (SEA) mixtures can be produced directly in the mixing plant just before the laying of the asphalt mixture. One major concern in handling sulfur-asphalt mix is the fear of the evolution of hydrogen sulfide ($H_2S$) during production and laying. $H_2S$ evolution starts at temperatures higher than 150° C., so that the application at temperatures up to 150° C. avoids pollution and safety problems. However, $H_2S$ evolution starts well below 150° C., i.e. about 130° C. Moreover, below 120° C., neither the reaction of the asphalt and sulfur nor the cross-linking of the SBS/sulfur blend could take place.

A need exists for asphalt compositions that can be performance grade. It would be advantageous if the compositions could include materials, such as sulfur, that enhance performance of the compositions, while being relatively inexpensive.

SUMMARY OF THE INVENTION

In view of the foregoing, asphalt concrete compositions, asphalt binder compositions, and methods of preparing the compositions are provided as embodiments of the present invention. The asphalt binder compositions generally include a polyphosphoric acid, a macromolecular polymer having a saturated backbone with macromolecular modifications, sulfur, and non-surfactant additives based on wax chemistry. In an aspect, the sulfur can be elemental sulfur or any form whether in powder form, slurry, or crystallized in the orthorhombic form. The binder can be added to asphalt concrete to produce the asphalt concrete compositions.

An asphalt concrete composition having high sulfur load with improved properties relative to high temperature rotational viscosity without a reduction in dynamic shear properties is provided as an embodiment of the present invention. In this embodiment, the asphalt concrete composition includes a polyphosphoric acid a macromolecular polymer having a saturated backbone with macromolecular modifications, sulfur, non-surfactant additives based on wax chemistry, and an asphalt concrete. Polyphosphoric acid can have the empirical formula $P_qH_rO_s$ in which q, r, and s are positive numbers such that q is greater or equal to 2 and preferably ranges from 3 to 20. Any linear compound of the empirical formula $P_qH_{q+2}O_{3q+1}$ or polyphosphoric acids that can be polycondensation products formed from heating of metaphosphoric acid can be used in embodiments of the present invention. In an aspect, the sulfur can be elemental sulfur or any form whether in powder form, slurry, or crystallized in the orthorhombic form. In an aspect, the asphalt concrete includes aggregate and bitumen.

The amounts of each component contained within the asphalt concrete composition can be varied. The polyphosphoric acid can be present in an amount effective to provide increased stiffness at the lower mixing temperatures. The macromolecular polymer can be present in an amount effective to increase viscosity of the composition so that it can be used in warm mix applications. Any polymer with a saturated hydrocarbon backbone, with or with reactive functionality can be used in embodiments of the present invention. Polymers formed from the monomers of ethylene, propylene, acrylate, butyacrylates, butylenes, hexenes, octenes, acrylate, butyacrylates, butylenes, etc.; long chain branched polyolefins with octenes; polyolefins graft or/or block/or diblock/or triblock polymers with maleic anhydride, fumarate and maleate esters, (meth)acrylate esters [e.g. glycidyl methacrylate and hydroxyethyl methacrylate] and (meth)acrylic acid; polyolefin elastomers containing reactive p-methylstyrene groups, such as poly(isobutylene-co-p-methylstyrene) elastomers; or combinations thereof can be used in embodiments of the present invention. The sulfur can be present in an amount effective to at least partially emulsify in the composition. The non-surfactant additives based on wax chemistry can be present in an amount effective to provide a lubricating effect on the composition.

As another embodiment of the present invention, a highly loaded sulfur-modified asphalt binder composition for use with asphalt concrete for improved properties relative to high temperature rotational viscosity without a reduction in dynamic shear properties is provided. In this embodiment, the binder includes a polyphosphoric acid, a macromolecular polymer having a saturated backbone with macromolecular modifications, non-surfactant additives based on wax chemistry, and sulfur. In an aspect, the sulfur can be elemental sulfur or any form whether in powder form, slurry, or crystallized in the orthorhombic form.

The amounts of the components of the binder composition can vary. For example, the polyphosphoric acid is present in a range of about 0 wt. % to about 2.0 wt. % to provide increase stiffness at lower mixing temperatures. As another example, the macromolecular polymer having a saturated backbone with macromolecular modifications is present in a range of about 0 wt. % to about 5 wt. % to increase elasticity of the binder so that it can be used in warm mix applications. The sulfur is present in an amount effective to at least partially emulsify in the composition. The non-surfactant additives based on wax chemistry is present in an amount effective to provide a lubricating effect on the composition. Other suitable amounts of each component will be apparent to those of skill in the art and are to be considered within the scope of the present invention.

Besides the compositional embodiments, methods of preparing the asphalt composition are also provided as embodiments of the present invention. In an embodiment, a method of preparing an asphalt concrete composition having high sulfur load with improved properties relative to high temperature rotational viscosity without a reduction in dynamic shear properties is provided.

In an embodiment, a binder composition is prepared that includes a polyphosphoric acid, a macromolecular polymer having a saturated backbone with macromolecular modifications, non-surfactant additives based on wax chemistry, and sulfur. The polyphosphoric acid is present in an amount effective to provide increase stiffness as lower mixing temperatures. The macromolecular polymer is present in an amount effective to increase elasticity of the composition. The non-surfactant additives based on wax chemistry is present in an amount effective to provide a lubricating effect on the composition. In an aspect, the sulfur can be elemental sulfur or any form whether in powder form, slurry, or crystallized in the orthorhombic form. The sulfur is present in an amount effective to at least partially emulsify in the composition. Once the binder has been prepared, it is combined with asphalt concrete to produce the asphalt concrete composition. As with other embodiments, the asphalt concrete includes aggregate and bitumen.

As indicated previously, sulfur has been explored to modify asphalt by others; however, sulfur-modified asphalt compositions have not able to be Superpave® performance graded (PG). The unreacted sulfur in the past attempts tended to cause embrittlement upon aging. Embodiments of the present invention include sulfur modified asphalt compositions that can perform as an asphalt binder in paving applications. The composition of the binder allows these materials to be performance graded and improves the grading of the asphalt over an unmodified control at both the high temperature and low temperature regions, which significantly enhances the both low and higher temperature applications of these materials in the pavement construction. The compositional embodiments of the present invention are compliant to super pave performance grades of asphalts and improves the grading of the asphalt over an unmodified control at both the high temperature and low temperature regions. The binder compositions of the present invention can be used as a low cost alternative to polymer modified binders in asphalt pavement applications.

The present invention relates to a warm mix sulfur modified asphalt for warm mix applications by modification of asphalt with sulfur, polyphosphoric acid (PPA), a polymer having saturated backbone macromolecules with macromolecular modifications (co-polymer, ter-polymer, graft-block co or ter-polymer (random, alternating, block, graft-block that can contain reactive functionality)), asphalt, and various warm mix additives. The sulfur can be present in a range of about 5 wt. % to about 50 wt. %. The PPA can be present in a range of about 0 wt. % to about 2.0 wt. %. The polymer having saturated backbone macromolecules can be present in a range of about 0 wt. % to about 5 wt. %. Asphalt can be present in a range of about 50 wt. % to about 90 wt. %.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

DETAILED DESCRIPTION OF THE INVENTION

Figure 1:
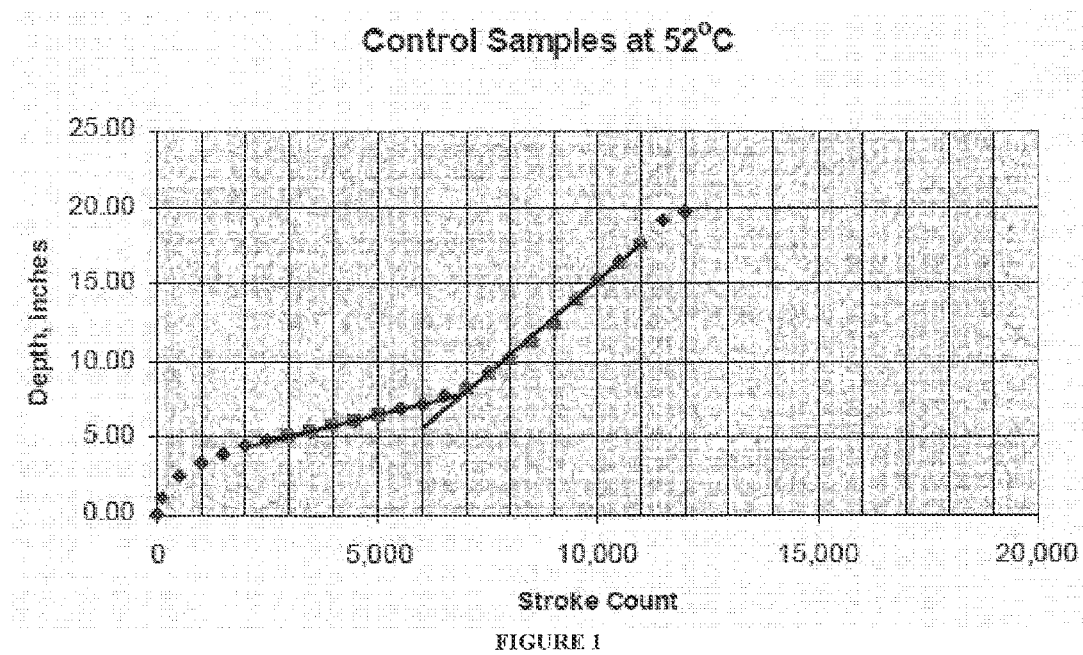
FIG. 1 illustrates the Stroke Count (Passes) versus Depth for the Blend No. 2 at 52° C. made in accordance with prior art embodiments.

It is desirable for asphalt concrete, including asphalt and aggregate, asphalt compositions for resurfacing asphalt concrete, and similar asphalt compositions to exhibit a certain number of specific mechanical properties to enable their use in various fields of application, especially when the asphalts are used as binders for superficial coats (road surfacing), as asphalt emulsions, or in industrial applications. As used herein, the term "asphalt" can be used interchangeably with "bitumen." As used herein, "asphalt concrete" is generally asphalt used as a binder with appropriate aggregate added, typically for use in roadways. The use of asphalt or asphalt emulsion binders surface treatment or as a very thin bituminous mix, or as a thicker structural layer of bituminous mix in asphalt concrete, is enhanced if these binders possess the requisite properties such as desirable levels of elasticity and plasticity.

The grades and characteristics of asphalt paving products are defined by various professional organizations, such as the Asphalt Institute. For example, Rolling Thin Film Oven (RTFO) and Pressure Aging Vessel (PAV) studies are used to simulate binder aging (hardening) characteristics. Dynamic Shear Rheometers (DSR) are used to measure binder properties at high and intermediate temperatures. This is used to predict permanent deformation or rutting and fatigue cracking. Industry custom uses the short form RTFO DSR to indicate the temperature at which a sample will show sufficient rutting resistance after rolling thin film oven (RTFO) aging (minimum rutting resistance as defined as a "G*·sin δ" over 2.20 kPa and measured by a dynamic shear rheometer (DSR)). Fatigue cracking is a series of interconnecting cracks caused by failure of the asphalt concrete surface under repeated traffic loading. Bending Beam Rheometers (BBR) are used to measure binder properties at low temperatures. These values predict thermal or low temperature cracking. Various industry standards, such as the Superpave standard, exist for defining such procedures for these experiments and measurement.

Asphalt grading is given in accordance with accepted standards in the industry, such as PG 64-22, where "PG" stands for Performance Grade and 64 is related to the higher temperature in degrees Celsius and −22 is the low temperature in degrees Celsius.

As indicated previously, asphalt concrete includes asphalt combined with aggregates in various rations, one exemplary ration being approximately 95 parts by weight of aggregate to approximately 5 parts by weight of liquid asphalt. The asphalt cement is used to bind together the aggregate material and limit its mobility when a load is applied. The aggregate is usually a mixture of mineral filler, fine aggregates, and coarse aggregates; the largest pieces of aggregate having a diameter equal to about ⅔ the thickness of the asphalt mat. The aggregate has crushed particles to provide sharp edges in the gravel and stone that, when combined with the liquid asphalt, create an aggregate interlock that improves the strength of the mat. The aggregate and liquid asphalt are heated and mixed to form an asphalt paving composition called hot-mix asphalt (HMA).

Elastic modulus, which is sometimes called Young's modulus, is a property that is often used to determine if an asphalt composition is suitable for a particular application. Elastic modulus (E) can be determined for a solid material and represents a constant ratio of stress and strain (a stiffness):E=stress/strain. A material is elastic if it is able to return to its original shape or size immediately after being stretched or squeezed. Almost all materials are elastic to some degree as long as the applied load does not cause it to deform permanently. Thus, the "flexibility" of any object or structure depends on its elastic modulus and geometric shape. The modulus of elasticity for a material is basically the slope of its stress-strain plot within the elastic range.

Asphalt has been the subject of exhaustive study to improve characteristics for use in paving. Various properties of asphalt are manipulated to produce a product that has the appropriate friction properties, rut resistance, fatigue and low temperature cracking resistance, and viscosity. Rut resistance is resistance to longitudinal surface depressions in the wheel paths. Rut resistance is resistance to permanent, longitudinal displacement of a localized area of the pavement surface caused by traffic pushing against the pavement. Heavy hydrocarbon that can be derived from, without limitation, natural asphalt (such as Gilsonite®), Trinidad Lake Asphalt, shale asphalt, bottoms from a solvent de-asphalting process, hard asphalt, blown asphalt, stiff refined asphalt, or a flux. Asphalt is usually the base ingredient for the primer and the binder. A primer can be asphalt, fibers (including but not limited to, mineral or cellulose), processing agent (including but not limited to, oligomeric wax, carboxylated, derivative of oligomeric wax, or low molecular weigh polyolefins), polymeric or elastomeric additive, or asphalt-derived. A primer melts to the aggregate. Asphalt binders without polymers are referred to as "neat".

The general field of the invention is the modification of asphalt by using sulfur, saturated polymer having backbone macromolecules with macromolecular modifications (co-polymer, ter-polymer, graft-block co or ter-polymer (random, alternating, block, graft-block that can contain reactive functionality)) 0-5 wt. %, Polyphosphoric acid and warm mix additives. The warm mix additives can be non-surfactant additives based on wax chemistry. The composition can be performance graded and used in warm mix asphalt applications.

None of the previous techniques used the combination of additives/modifiers and developed a binder specifically for warm mix asphalt applications. More specifically to be able to compact asphalt from 30-70° F. below conventional asphalt mixtures and obtain equal or better performance at a reduced total raw material cost. The mixing of sulfur under high shear in loadings from 20-50 wt. % produced a binder with improved low temperature properties and reduced high temperature viscosities. The combination of this binder containing saturated backbone macromolecules with macromolecular modifications (co-polymer, ter-polymer, graft-block co or ter-polymer (random, alternating, block, graft-block that can contain reactive functionality)), warm mix additives, and/or PPA produced a novel compound with macromolecular modified asphalt properties and warm mix binder at a reduced overall raw material cost.

In view of the foregoing, asphalt concrete compositions, asphalt binder compositions, and methods of preparing the compositions are provided as embodiments of the present invention. The asphalt binder compositions generally include a polyphosphoric acid, a macromolecular polymer having a saturated backbone with macromolecular modifications, non-surfactant additives based on wax chemistry, and sulfur. In an aspect, the sulfur can be elemental sulfur or any form whether in powder form, slurry, or crystallized in the orthorhombic form. The binder can be added to asphalt concrete to produce the asphalt concrete compositions.

An asphalt concrete composition having high sulfur load with improved properties relative to high temperature rotational viscosity without a reduction in dynamic shear properties is provided as an embodiment of the present invention. In this embodiment, the asphalt concrete composition includes a polyphosphoric acid, a macromolecular polymer having a saturated backbone with macromolecular modifications, non-surfactant additives based on wax chemistry, sulfur, and an asphalt concrete. Polyphosphoric acid can have the empirical formula $P_qH_rO_s$ in which q, r, and s are positive numbers such that q is greater or equal to 2 and preferably ranges from 3-20. Any linear compound of the empirical formula $P_qH_{q+2}O_{3q+1}$ or polyphosphoric acids that can be polycondensation products formed from heating of metaphosphoric acid can be used in embodiments of the present invention. In an aspect, the sulfur can be elemental sulfur or any form whether in powder form, slurry, or crystallized in the orthorhombic form. In an aspect, the asphalt concrete includes aggregate and bitumen.

The amounts of each component contained within the asphalt concrete composition can be varied. The polyphosphoric acid can be present in an amount effective to provide increased stiffness at lower mixing temperatures. The macromolecular polymer can be present in an amount effective to increase elasticity of the composition so that it can be used in warm mix applications. Any polymer with a saturated hydrocarbon backbone, with or with reactive functionality can be used in embodiments of the present invention. Polymers formed from the monomers of ethylene, propylene, acrylate, butyacrylates, butylenes, hexenes, octenes, acrylate, butyacrylates, butylenes, etc.; long chain branched polyolefins with octenes; polyolefins graft or/or block/or diblock/or triblock polymers with maleic anhydride, fumarate and maleate esters, (meth)acrylate esters [e.g. glycidyl methacrylate and hydroxyethyl methacrylate] and (meth)acrylic acid; polyolefin elastomers containing reactive p-methylstyrene groups, such as poly(isobutylene-co-p-methylstyrene) elastomers; or combinations thereof can be used in embodiments of the present invention. The non-surfactant additives based on wax chemistry can be present in an amount effective to provide a lubricating effect on the compositions. The sulfur can be present in an amount effective to at least partially emulsify in the composition.

As another embodiment of the present invention, a highly loaded sulfur-modified asphalt binder composition for use with asphalt concrete for improved properties relative to high temperature rotational viscosity without a reduction in dynamic shear properties is provided. In this embodiment, the binder includes a polyphosphoric acid, a macromolecular polymer having a saturated backbone with macromolecular modifications, non-surfactant additives based on wax chemistry, and sulfur. In an aspect, the sulfur can be elemental sulfur or any form whether in powder form, slurry, or crystallized in the orthorhombic form.

The amounts of the components of the asphalt composition and the binder composition can vary. For example, the polyphosphoric acid is present in a range of about 0 wt. % to about 2.0 wt. % to provide increased stiffness at lower mixing temperatures. As another example, the macromolecular polymer having a saturated backbone with macromolecular modifications is present in a range of about 0 wt. % to about 10 wt. % to increase elasticity of the binder so that it can be used in warm mix applications. The non-surfactant additives based on wax chemistry can be present in an amount effective to provide a lubricating effect on the composition. In an aspect, the non-surfactant additives based on wax chemistry can be present in a range of about 0 wt. % to about 10 wt. %. The non-surfactant additives can include various warm mix additives. The sulfur is present in an amount effective to at least partially emulsify in the composition. In an aspect, the sulfur is present in loadings ranging from about 20 wt. % to about 50 wt. %. When there is asphalt concrete present, the asphalt concrete can be present in a range of about 50 wt. % to about 90 wt. %. Other suitable amounts of each component will be apparent to those of skill in the art and are to be considered within the scope of the present invention.

Besides the compositional embodiments, methods of preparing the asphalt composition are also provided as embodiments of the present invention. In an embodiment, a method of preparing an asphalt concrete composition having high sulfur load with improved properties relative to high temperature rotational viscosity without a reduction in dynamic shear properties is provided.

In an embodiment, a binder composition is prepared that includes a polyphosphoric acid, a macromolecular polymer having a saturated backbone with macromolecular modifications, and sulfur. In an aspect, the sulfur can be elemental sulfur or any form whether in powder form, slurry, or crystallized in the orthorhombic form. The polyphosphoric acid is present in an amount effective to provide increased stiffness and lower mixing temperatures. The macromolecular polymer is present in an amount effective to increase elasticity of the composition so that it can be used in warm mix applications. The non-surfactant additives based on wax chemistry is present in an amount effective to provide a lubricating effect on the composition. The sulfur is present in an amount effective to at least partially emulsify in the composition. Once the binder has been prepared, it is combined with asphalt concrete to produce the asphalt concrete composition. As with other embodiments, the asphalt concrete includes aggregate and bitumen.

The compositional embodiments of the present invention are compliant to super pave performance grades of asphalts and improves the grading of the asphalt over an unmodified control at both the high temperature and low temperature regions. The binder compositions of the present invention can be used as a low cost alternative to polymer modified binders in asphalt pavement applications. The compositions of the present invention can be used in paving applications.

Embodiments of the present invention include sulfur modified asphalt compositions that can perform as an asphalt binder in paving applications. The composition of the binder allows these materials to be performance graded and improves the grading of the asphalt over an unmodified control at both the high temperature and low temperature regions, which significantly enhances the applications in both low and higher temperature ranges in the pavement construction industry in which the compositions of the present invention can be used.

As indicated previously, sulfur has been explored to modify asphalt by others; however, sulfur-modified asphalt compositions have not able to be super pave performance graded. The unreacted sulfur in the past attempts tended to cause embrittlement upon aging. Embodiments of the present invention include sulfur modified asphalt compositions that can perform as an asphalt binder in paving applications.

In an aspect, the compositions of the present invention are PG graded. The performance grade of the compositions of the present invention can vary depending upon the amounts of the components that are present in the compositions. For example, if the sulfur is present in an amount of about 20 wt. %, then the composition is PG graded as 64-34. An another example, if the sulfur is present in an amount of about 50 wt. %, then the composition is PG graded as 64-28.

The components contained in compositions of the present invention provide the compositions with good physical properties, particularly when compared with conventional asphalt compositions. For example, in an aspect, the compositions of the present invention have a dynamic shear in a range of about 1,000 G*·sin δ to about 5,000 G*·sin δ at about 25° C. Besides the dynamic shear, the rotation viscosity is also reduced as a result of the components contained in the compositions of the present invention. In an aspect, the composition has a rotational viscosity in a range of about 0.100 Pa·sec to about 0.300 Pa·sec.

The types of macromolecular polymer having a saturated backbone with macromolecular modifications can vary. For example, the macromolecular polymer having a saturated backbone with macromolecular modifications can include any polymer with a saturated hydrocarbon backbone, with or with reactive functionality can be used in embodiments of the present invention. Polymers formed from the monomers of ethylene, propylene, acrylate, butyacrylates, butylenes, hexenes, octenes, acrylate, butyacrylates, butylenes, etc.; long chain branched polyolefins with octenes; polyolefins graft or/or block/or diblock/or triblock polymers with maleic anhydride, fumarate and maleate esters, (meth)acrylate esters [e.g. glycidyl methacrylate and hydroxyethyl methacrylate] and (meth)acrylic acid; polyolefin elastomers containing reactive p-methylstyrene groups, such as poly(isobutylene-co-p-methylstyrene) elastomers; or combinations thereof can be used in embodiments of the present invention. [Other suitable types of polymers that can be used in the present invention will be apparent to those of skill in the art and are to be considered within the scope of the present invention.

The types of non-surfactant additives based on wax chemistry used in embodiments of the present invention can be varied depending on the desired results. For example, examples of suitable non-surfactant additives based on wax chemistry can include Sasobit® wax, Fischer-Tropsch wax, ceresin wax, montan wax, wax extracted from lignite and brown coal, Ozocerite that is found in lignite beds, peat wax, paraffin wax, microcrystalline wax, Petroleum jelly, non-paraffin wax, natural wax, carnuba wax, bees wax, candelilla wax, shellac wax, castor wax, rice wax, modified natural wax, partial synthetic wax, polyethylene wax that is based on polyethylene, chemically modified wax, esterified chemically modified wax, saponified chemically modified wax, substituted amide waxes, polymerized α-olefins waxes, synthetic wax, or combinations thereof. Other suitable types of non-surfactant additives based on wax chemistry will be apparent to those of skill in the art and are to be considered within the scope of the present invention.

Numerous approaches have been used to incorporate sulfur into asphalt compositions in the past. In such prior attempts, sulfur has been added in a range of between about 5 wt. % to about 70 wt. % sulfur into asphalt and non-asphalt based binders to perform in asphalt pavement applications. None of the previous techniques used the combination of additives/ modifiers and developed a performance graded binder specifically for warm mix asphalt applications. More specifically to be able to compact asphalt from about 30° F. to about 70° F. below conventional asphalt mixtures and obtain equal or better performance at a reduced total raw material cost.

The mixing of sulfur under high shear in loadings from 20-50 wt. % produced a binder with improved low temperature properties and reduced high temperature viscosities. The combination of this binder containing polymers having saturated backbone macromolecules with macromolecular modifications (co-polymer, ter-polymer, graft-block co or ter-polymer (random, alternating, block, graft-block that can contain reactive functionality)), non-surfactant additives based on wax chemistry, such as Sasobit® wax and/or PPA produced a compound with macromolecular modified asphalt properties that can be used as a warm mix binder at a reduced overall raw material cost. In an aspect, the non-surfactant additives based on wax chemistry can include special fine crystalline long chain aliphatic hydrocarbons. The compositions and methods of the present invention can lend itself to using modified asphalts in warm mix applications, where it is currently limited by the high viscosity of modified binders. Besides the advantages related to the physical properties of the compounds of the present invention, using these types of binders in warm mix applications further reduces the possible emissions of $H_2S$.

Historically, sulfur has had limited use in asphalt due to the generation of hydrogen sulfide at temperatures where asphalt is used. Sulfur has been used in very low percentages of 0.1 wt. %-5.0% wt. % by the weight of polymer as a crosslinking agent for use with polymers, but has limited use due to the temperatures required for these mixes. The current invention allows for the use of sulfur with specific macromolecules at reduced temperatures. The addition of sulfur has been shown when mixed under high shear to dramatically reduce the rotational viscosity and other high temperature related properties. By combining sulfur with other additives, as described herein, the enhanced synergies of the components are obtained. Sulfur, when mixed with Elvaloy® polymers, has produced a polymer with improved high temperature properties. When this combination is further reacted with polyphosphoric acid and sulfur, the performance is enhanced. The polyphosphoric acid and sulfur react at the lower temperatures (250-275° F.) and provide an enhanced binder. These binders can also perform better than conventional polymer modified binders, providing a more workable warm mix with better compaction.

Most prior attempts at using sulfur modified asphalt compositions describe polymerizing sulfur with hydrocarbons of specific functionality to produce a polysulfidic structure. These types of materials do not display the same rheological response of asphalt and tend to have poor low temperature properties and poor aging properties, particularly when compared to compositions made in accordance with embodiments of the present invention.

When asphalt used in combination with additives such as Sasobit® wax, low temperature properties have been negatively impacted significantly limiting the applicability at lower temperatures. The negative impact of the Sasobit® wax at low temperatures is improved by the incorporation of sulfur resulting in an improved low and high temperature property warm mix sulfur modified asphalt allowing the applicability and utilization at lower temperature application.

The addition of sulfur with PPA produces a binder with lower high temperature viscosities, and improved overall performance based on the reaction of the sulfur and PPA at lower temperatures and warm mix processability.

Embodiments of the current invention allow for the utilization of sulfur with specific saturated backbone macromolecules with macromolecular modifications (co-polymer, ter-polymer, graft-block co or ter-polymer (random, alternating, block, graft-block that can contain reactive functionality)) at reduced temperatures. The addition of sulfur has been shown when mixed under high shear to dramatically reduce the rotational viscosity and other high temperature related properties. By combining sulfur with other additives, you can get the synergies of the various components. Sulfur, when mixed with Elvaloy® polymer, has produced a polymer with improved high temperature properties. When this combination is further reacted with PPA and sulfur, the performance is enhanced. The polyphosphoric acid and sulfur react at the lower temperatures (250-275° F.) and provide an enhanced binder. These binders can also perform better than conventional polymer modified binders, providing a more workable warm mix with better compaction.

Use of the compositions of the present invention have resulted in the development of lower cost warm mix asphalt binder compositions using between 20-50 wt. % sulfur loading. The sulfur modified asphalt binder compositions of the present invention can be handled and treated as a performance grade binder. For example, the combination of 64-22 asphalt, sulfur, PPA, saturated backbone macromolecules with macromolecular modifications (co-polymer, ter-polymer, graft-block co or ter-polymer (random, alternating, block, graft-block that can contain reactive functionality)), and Sasobit® wax produces a PG 76-22 asphalt binder that can be used for warm mix applications.

The compositions and methods of the present invention allow for high loading of sulfur in asphalt binders that can be used in warm mix asphalt applications in existing hot mix asphalt plants. The compositions and methods of the present invention also provide for reduced exposure to hydrogen sulfide generation by use as a warm mix asphalt binder.

Embodiments of the present invention that include a sulfur modified compound can be used in road construction application. The technology used in embodiments of the present invention include several different attributes that provide enhanced performance while using sulfur modified asphalt.

In an aspect, sulfur is incorporated into compounds in the weight percents ranging from about 20 wt. % to about 50 wt. % in conjunction with PPA and any saturated polymer having backbone macromolecules (ethylene, propylene, butylenes, etc.) with macromolecular modifications (co-polymer, ter-polymer, graft-block co or ter-polymer (random, alternating, block, graft-block that can contain reactive functionality)). The polymer can be present in a range of about 0 to about 5 wt. %. The compositions of the present invention incorporate the use of PPA with a high loading of sulfur. Furthermore, the compositions are capable of being a performance grade binder that have high sulfur loading polymer modified asphalt with low rotational viscosity.

Several advantages exist when using the compositions and methods of the present invention. As a first advantage, compositions are produced using a macromolecular modified highly loaded sulfur asphalt binder at a lower total material cost with equal of better performance when compared with traditional asphalt compositions.

As an advantage of the present invention, a highly sulfur loaded modified asphalt can be made that can be performance graded and utilized as a warm mix asphalt binder. Additionally, a significant improvement of the low temperature properties of the binder and high temperature processability with sulfur used in embodiments of the present invention was observed.

When warm mix additives are used in asphalt compositions, the warm mix additives tend to increase the cost per ton of asphalt being produced from $1.25-$3.00/ton. The use of 20-50 wt. % sulfur in the asphalt dramatically reduces the total raw material cost, while still providing equal/better performance.

EXAMPLES

Example 1

In Experiment A, base PG 64-22 asphalt modified with 1.5 wt. % Elvaloy® polymer and 0.5 wt. % 115% PPA and was compared to the same blend with the addition of 20 wt. % sulfur and 4.0 wt. % Sasobit® wax, in accordance with embodiments of the present invention. The addition of sulfur into this compound provided several advantageous attributes that could not be obtained economically by other methods.

The base PG 64-22 with 0.5 wt. % PPA and 1.5 wt. % Elvaloy® polymer produced a binder with a PG 70-22 with an effective temperature range of 74.0-27.5, as shown in Table 2. This binder also displayed a high Rotational Viscosity of 1.563 Pa·sec. When this compound was made by blending 20 wt. % sulfur under high shear into the blend and then being subsequently modified, in accordance with embodiments of the present invention, enhanced performance was observed both at the processing temperature and at low temperatures. The sulfur modified binder displayed a 62% reduction in rotational viscosity at 135° C., while improving the effective temperature range to 73.2-30.3 for a PG 70-28 binder, as shown in Table 3.

The addition of 4.0 wt. % Sasobit® wax to the binder, in accordance with embodiments of the present invention, dropped the rotational viscosity to 0.328 Pa-sec, as shown in Table 4. The rotational viscosity displayed a 45% decrease at 135° C. with the addition of Sasobit® wax, but also impacted the effective temperature range. The effective temperature range was 84.7-16.2, which was over a two grade reduction on the low temperature side, while only providing a grade and half at the high end. The effective temperature range of this binder makes it ideal for use in extreme hot climate conditions.

The resulting properties are significant because a binder having a comparable performance grading typically requires the use of a high percentage of polymer >4 wt. % and the use of a very soft base asphalt to maintain the low temperature properties. In this Example 1, there is a synergistic reaction between the PPA and sulfur that provides the additional improvement at the low end, while reducing the high temperature rotational viscosity. The compositions and methods of the present invention can lend itself to using modified asphalts in warm mix applications, where such applications are currently limited by the high viscosity of modified binders. Furthermore, using these types of binders in warm mix applications further reduces the possible emissions of $H_2S$.

Typically, the addition of only sulfur can produce embrittlement during aging. The sulfur modified compound of the present invention showed better properties after PAV aging (lower $G^* \cdot \sin \delta$ Delta) for a given temperature. The sulfur compound of the present invention displayed a value of 5,390 kPa at 16° C. versus the non-sulfur modified binder that displayed a value of 6,680 kPa at 16° C., which is statistically higher. The improvement is at least partially related to the synergistic effect between PPA and the sulfur.

TABLE 2

PG Determination for Binder A - Base, (PG 64-22, w/1.5% Elvaloy RET & 0.5% 115% PPA)

| PROPERTY | | | AASHTO TEST METHOD | SPECIFICATIONS | RESULTS | | |
|---|---|---|---|---|---|---|---|
| ORIGINAL BINDER | | | | | | | |
| Specific Gravity | | 15.6° C. | T 228 | Report | 1.034 | | |
| Softening Point, ° C. (° F.) | | | ASTM D 36 | Report | 63 (145) | | |
| Penetration (100 grams, 5 sec.), dmm | | 25° C. | T 49 | Report | 71 | | |
| Viscosity, Pa · s | | 135° C. | T 316 | 3.0 max. | 1.563 | | |
| | | 165° C. | | Report | 0.320 | | |
| Separation, R&B Difference, 48 hrs., ° C. (° F.) | | 163° C. | | | | | |
| Top, ⅓, Softening Point, ° C. (° F.) | | | ASTM D 5892 | Report | 60.6 (141.0) | | |
| Bottom, ⅓, Softening Point, ° C. (° F.) | | | | | 60.3 (140.5) | | |
| Difference, ° C. (° F.) | | | | 2 (4) max. | 0.3 (0.5) | | |
| Dynamic Shear (G*/sin δ, 10 rad./sec.), kPa | | | T 315 | 1.0 min. | G* | δ | G*/sin δ |
| | | 64° C. | | | 3.620 | 64.6 | 4.010 |
| | | 82° C. | | | 0.760 | 69.3 | 0.813 |
| AFTER RTFOT @ 135° C. | | | | | | | |
| Mass Change, % (Mass Loss is reported as Negative) | | | T 240 | 1.0 max. | −0.023 | | |
| Dynamic Shear (G*/sin δ, 10 rad./sec.), kPa | | | T 315 | 2.2 min. | G* | δ | G*/sin δ |
| | | 70° C. | | | 2.740 | 62.4 | 3.090 |
| | | 76° C. | | | 1.650 | 63.5 | 1.850 |
| MSCR | 0.1 kPa | % Rec. | 64° C. | TP 70-08 | Report | 65.3 | |
| | | Jnr | | | | 0.30 | |
| | 3.2 kPa | % Rec. | | | | 62.1 | |
| | | Jnr | | | | 0.31 | |
| PRESSURE AGING RESIDUE (100° C., 300 psi, 20 hr.) | | | R 28 | | | | |
| Dynamic Shear (G* · sin δ, 10 rad./sec.), kPa | | | T 315 | Report | G* | δ | G* · sin δ |
| | | 16° C. | | 5,000 max. | 9,660 | 43.8 | 6,680 |
| | | 28° C. | | | 1,560 | 53.8 | 1,260 |
| Creep Stiffness | Stiffness, MPa (60 sec.) | | −12° C. | T 313 | 300 max. | 136 | |
| | m Value | | | | 0.300 min. | 0.373 | |
| | Stiffness, MPa (60 sec.) | | −18° C. | | 300 max. | 322 | |
| | m Value | | | | 0.300 min. | 0.302 | |
| 'True' Performance Grade | | | | | 74.0-27.5 | | |
| AASHTO M 320 SUPERPAVE ™ Binder Grade, PG: | | | | | PG 70-22 | | |

TABLE 3

PG Determination for Binder A - Sulfur, (PG 64-22, w/1.5% Elvaloy RET & 0.5% PPA & 20 Wt. % Sulfur)

| PROPERTY | | | AASHTO TEST METHOD | SPECIFICATIONS | RESULTS | | |
|---|---|---|---|---|---|---|---|
| ORIGINAL BINDER | | | | | | | |
| H₂S Emissions, ppm | | | Detector Tubes | Report | 5 ppm Before, 40 ppm After | | |
| Specific Gravity | | 15.6° C. | T 228 | Report | 1.118 | | |
| Softening Point, ° C. (° F.) | | | ASTM D 36 | Report | 60 (140) | | |
| Penetration (100 grams, 5 sec.), dmm | | 25° C. | T 49 | Report | 82 | | |
| Viscosity, Pa · s | | 135° C. | T 316 | 3.0 max. | 0.593 | | |
| Dynamic Shear (G*/sin δ, 10 rad./sec.), kPa | | | T 315 | 1.0 min. | G* | δ | G*/sin δ |
| | | 70° C. | | | 1.230 | 64.7 | 1.360 |
| | | 76° C. | | | 0.710 | 67.5 | 0.769 |
| AFTER RTFOT @ 135° C. | | | | | | | |
| Mass Change, % (Mass Loss is reported as Negative) | | | T 240 | 1.0 max. | −0.925 | | |
| Dynamic Shear (G*/sin δ, 10 rad./sec.), kPa | | | T 315 | 2.2 min. | G* | δ | G*/sin δ |
| | | 70° C. | | | 3.820 | 63.6 | 4.260 |
| | | 76° C. | | | 2.210 | 65.9 | 2.420 |
| | | 82° C. | | | 1.210 | 69.1 | 1.300 |
| MSCR | 0.1 kPa | % Rec. | 64° C. | TP 70-08 | Report | 43.9 | |
| | | Jnr | | | | 0.76 | |

TABLE 3-continued

PG Determination for Binder A - Sulfur, (PG 64-22, w/1.5% Elvaloy RET & 0.5% PPA & 20 Wt. % Sulfur)

| PROPERTY | | AASHTO TEST METHOD | SPECIFICATIONS | RESULTS | | |
|---|---|---|---|---|---|---|
| 3.2 kPa | % Rec. | | | 20.3 | | |
| | Jnr | | | 1.24 | | |
| PRESSURE AGING RESIDUE (100° C., 300 psi, 20 hr.) | | R 28 | | | | |
| Dynamic Shear (G* · sin δ, 10 rad./sec.), kPa | | T 315 | Report | G* | δ | G* · sin δ |
| | 16° C. | | 5,000 max. | 8,100 | 41.7 | 5,390 |
| | 25° C. | | | 2,100 | 48.7 | 1,580 |
| Creep Stiffness | Stiffness, MPa (60 sec.) | −18° C. | T 313 | 300 max. | 207 | |
| | m Value | | | 0.300 min. | 0.325 | |
| | Stiffness, MPa (60 sec.) | −24° C. | | 300 max. | 414 | |
| | m Value | | | 0.300 min. | 0.263 | |
| 'True' Performance Grade | | | | 73.2-30.3 | | |
| AASHTO M 320 SUPERPAVE ™ Binder Grade, PG: | | | | 70-28 | | |

TABLE 4

PG Determination for Binder A - Sasobit ® wax, (PG 64-22, w/1.5% Elvaloy RET & 0.5% PPA & 20 Wt. % Sulfur & 4.0 wt. % Sasobit)

| PROPERTY | | AASHTO TEST METHOD | SPECIFICATIONS | RESULTS | | |
|---|---|---|---|---|---|---|
| ORIGINAL BINDER | | | | | | |
| Specific Gravity | 15.6° C. | T 228 | Report | 1.129 | | |
| Viscosity, Pa · s | 135° C. | T 316 | 3.0 max. | 0.328 | | |
| Dynamic Shear (G*/sin δ, 10 rad./sec.), kPa | | T 315 | 1.0 min. | G* | δ | G*/sin δ |
| | 82° C. | | | 2.170 | 63.9 | 2.420 |
| | 88° C. | | | 0.801 | 68.2 | 0.863 |
| AFTER RTFOT | | | | | | |
| Mass Change, % (Mass Loss is reported as Negative) | | T 240 | 1.0 max. | −0.729 | | |
| Dynamic Shear (G*/sin δ, 10 rad./sec.), kPa | | T 315 | 2.2 min. | G* | δ | G*/sin δ |
| | 82° C. | | | 2.470 | 60.1 | 2.850 |
| | 88° C. | | | 1.440 | 64.1 | 1.600 |
| PRESSURE AGING RESIDUE (100° C., 300 psi, 20 hr.) | | R 28 | | | | |
| Dynamic Shear (G* · sin δ, 10 rad./sec.), kPa | | T 315 | Report | G* | δ | G* · sin δ |
| | 25° C. | | 5,000 max. | 5,940 | 35.2 | 3,430 |
| | 22° C. | | | 8,330 | 33.8 | 4,640 |
| Creep Stiffness | Stiffness, MPa (60 sec.) | −6° C. | T 313 | 300 max. | 83 | |
| | m Value | | | 0.300 min. | 0.301 | |
| | Stiffness, MPa (60 sec.) | −12° C. | | 300 max. | 152 | |
| | m Value | | | 0.300 min. | 0.276 | |
| 'True' Performance Grade | | | | 84.7-16.2 | | |
| AASHTO M 320 SUPERPAVE ™ Binder Grade, PG: | | | | PG 82-16 | | |

Example 2

A sulfur modified compound has been developed in accordance with embodiments of the present invention that can be used in the road construction. The technology of the present invention results in several different unique attributes that provide unexpected performance properties while using sulfur modified asphalt. The basis for the technology is the incorporation of elemental sulfur into compounds in the weight percents from 20-50 wt. % in conjunction with polyphosphoric acid.

In Experiment B, a base PG 64-28 asphalt modified with 0.5 wt. % 115% PPA, as shown in Table 5, was compared to the same blend with the addition of 20 wt. % (Table 6) sulfur and 3.5 wt. % Sasobit® wax, as shown in Table 7. The addition of sulfur into this compound provided several unique attributes that could not be obtain economically by other methods.

The base PG 64-28 with 0.5 wt. % PPA produced a binder with a PG 64-28 rating with an effective temperature range of 69.2-31.4, as shown in Table 5. This binder also displayed a Rotational Viscosity of 0.745 Pa-sec. When this compound was made by blending 20 wt. % sulfur under high shear into the blend in accordance with embodiments of the present invention and then subsequently modifying enhanced performance was observed both at the processing temperature and low temperatures. The sulfur modified binder displayed a 64% reduction in rotational viscosity at 135° C., while improving the effective temperature range to 65.9-34.3 for a PG 64-34 binder, as shown in Table 6.

When 3.5 wt. % Sasobit® wax was subsequently added to PG 64-28, 0.5 wt. % 115% PPA and 20 wt. % Sulfur further benefits were observed, as shown in Table 7. The addition of Sasobit® wax decreased the rotational viscosity at 135° C. to 0.226 Pa-sec and also increased the high temperature grade to 79.1-27.3. The combination of sulfur and Sasobit® wax produced a binder with an effective temperature range of 106.4 degrees. There was a change in the low temperature grade from −34.3 to −27.3, but still produced excellent low temperature properties. There was an effective 6 degree improvement in the grade with a 17% decrease in rotational viscosity. The results obtained using this composition make this composition an ideal binder for use in warm mix asphalt applications.

The resulting properties are significant because a binder having a comparable performance grading typically requires the use of a high percentage of polymer >4 wt. % and the use of a very soft base asphalt to maintain the low temperature properties. In this Example, there is a synergistic reaction between the PPA and sulfur that provides the additional improvement at the low end, while reducing the high temperature rotational viscosity. The compositions and methods of the present invention can lend itself to using modified asphalts in warm mix applications, where it is currently limited by the high viscosity of modified binders. Furthermore, using these types of binders in warm mix applications further reduces the possible emissions of $H_2S$.

TABLE 5

PG Determination for Binder B - Base, (PG 64-28, w/0.5% PPA)

| PROPERTY | | | AASHTO TEST METHOD | SPECIFICATIONS | RESULTS | | |
|---|---|---|---|---|---|---|---|
| ORIGINAL BINDER | | | | | | | |
| Flash Point, ° C. (° F.) | | | T 48 | 230 min. | 273 (524) | | |
| Specific Gravity | | 15.6° C. | T 228 | Report | 1.034 | | |
| Softening Point, ° C. (° F.) | | | ASTM D 36 | Report | 57 (135) | | |
| Penetration (100 grams, 5 sec.), dmm | | 25° C. | T 49 | Report | 67 | | |
| Viscosity, Pa · s | | 135° C. | T 316 | 3.0 max. | 0.745 | | |
| | | 165° C. | | Report | 0.179 | | |
| Dynamic Shear (G*/sin δ, 10 rad./sec.), kPa | | | T 315 | 1.0 min. | G* | δ | G*/sin δ |
| | | 64° C. | | | 2.180 | 78.2 | 2.230 |
| | | 70° C. | | | 1.120 | 80.7 | 1.130 |
| AFTER RTFOT @ 135° C. | | | | | | | |
| Mass Change, % (Mass Loss is reported as Negative) | | | T 240 | 1.0 max. | −0.158 | | |
| Dynamic Shear (G*/sin δ, 10 rad./sec.), kPa | | | T 315 | 2.2 min. | G* | δ | G*/sin δ |
| | | 64° C. | | | 3.990 | 74.0 | 4.150 |
| | | 70° C. | | | 2.060 | 76.6 | 2.120 |
| MSCR | 0.1 kPa | % Rec. | 64° C. | TP 70-08 | Report | 27.5 | |
| | | Jnr | | | | 1.00 | |
| | 3.2 kPa | % Rec. | | | | 7.05 | |
| | | Jnr | | | | 1.49 | |
| PRESSURE AGING RESIDUE (100° C., 300 psi, 20 hr.) | | | R 28 | | | | |
| Dynamic Shear (G* · sin δ, 10 rad./sec.), kPa | | | T 315 | Report | G* | δ | G* · sin δ |
| | | 16° C. | | 5,000 max. | 8,270 | 42.7 | 5,610 |
| | | 19° C. | | | 5,410 | 44.8 | 3,810 |
| | | 22° C. | | | 3,460 | 46.8 | 2,520 |
| Creep Stiffness | Stiffness, MPa (60 sec.) | | −18° C. | T 313 | 300 max. | 203 | |
| | m Value | | | | 0.300 min. | 0.364 | |
| | Stiffness, MPa (60 sec.) | | −24° C. | | 300 max. | 405 | |
| | m Value | | | | 0.300 min. | 0.281 | |
| 'True' Performance Grade | | | | | 69.7-31.4 | | |
| AASHTO M 320 SUPERPAVE ™ Binder Grade, PG: | | | | | 64-28 | | |

TABLE 6

PG Determination for Binder B - Sulfur, (PG 64-28, w/ 0.5% 115% PPA & 20 Wt. % Sulfur)

| PROPERTY | | AASHTO TEST METHOD | SPECIFICATIONS | RESULTS | | |
|---|---|---|---|---|---|---|
| ORIGINAL BINDER | | | | | | |
| H2S Emissions, ppm | | Detector Tubes | Report | 0 ppm Before, 80 ppm After | | |
| Specific Gravity | 15.6° C. | T 228 | Report | 1.135 | | |
| Softening Point, ° C. (° F.) | | ASTM D 36 | Report | 50 (122) | | |
| Penetration (100 grams, 5 sec.), dmm | 25° C. | T 49 | Report | 126 | | |
| Viscosity, Pa · s | 135° C. | T 316 | 3.0 max. | 0.272 | | |
| Dynamic Shear (G*/sin δ, 10 rad./sec.), | | T 315 | 1.0 min. | G* | δ | G*/sin δ |

TABLE 6-continued

PG Determination for Binder B - Sulfur, (PG 64-28, w/ 0.5% 115% PPA & 20 Wt. % Sulfur)

| PROPERTY | | | | AASHTO TEST METHOD | SPECIFICATIONS | RESULTS | | |
|---|---|---|---|---|---|---|---|---|
| kPa | | | 64° C. | | | 1.320 | 75.9 | 1.360 |
| | | | 70° C. | | | 0.663 | 79.5 | 0.675 |
| AFTER RTFOT @ 135° C. | | | | | | | | |
| Mass Change, % (Mass Loss is reported as Negative) | | | | T 240 | 1.0 max. | −0.888 | | |
| Dynamic Shear (G*/sin δ, 10 rad./sec.), kPa | | | | T 315 | 2.2 min. | G* | δ | G*/sin δ |
| | | | 64° C. | | | 2.520 | 73.6 | 2.620 |
| | | | 70° C. | | | 1.470 | 77.4 | 1.510 |
| MSCR | 0.1 kPa | % Rec. | 64° C. | TP 70-08 | Report | 16.3 | | |
| | | Jnr | | | | 3.29 | | |
| | 3.2 kPa | % Rec. | | | | 1.9 | | |
| | | Jnr | | | | 5.86 | | |
| PRESSURE AGING RESIDUE (100° C., 300 psi, 20 hr.) | | | | R 28 | | | | |
| Dynamic Shear (G* · sin δ, 10 rad./sec.), kPa | | | | T 315 | Report | G* | δ | G* · sin δ |
| | | | 16° C. | | 5,000 max. | 7,610 | 42.0 | 5,100 |
| | | | 19° C. | | | 4,820 | 44.3 | 3,370 |
| Creep Stiffness | Stiffness, MPa (60 sec.) | | −18° C. | T 313 | 300 max. | 141 | | |
| | m Value | | | | 0.300 min. | 0.360 | | |
| | Stiffness, MPa (60 sec.) | | −24° C. | | 300 max. | 289 | | |
| | m Value | | | | 0.300 min. | 0.319 | | |
| 'True' Performance Grade | | | | | | 65.9-34.3 | | |
| AASHTO M 320 SUPERPAVE ™ Binder Grade, PG: | | | | | | 64-34 | | |

TABLE 7

PG Determination for Binder B - Sasobit ® wax (PG 64-28, w/ 0.5% 115% PPA & 20 Wt. % Sulfur & 3.5 wt. % Sasobit)

| PROPERTY | | AASHTO TEST METHOD | SPECIFICATIONS | RESULTSP | | |
|---|---|---|---|---|---|---|
| ORIGINAL BINDER | | | | | | |
| Specific Gravity | 15.6° C. | T 228 | Report | 1.139 | | |
| Viscosity, Pa · s | 135° C. | T 316 | 3.0 max. | 0.226 | | |
| Dynamic Shear (G*/sin δ, 10 rad./sec.), kPa | | T 315 | 1.0 min. | G* | δ | G*/sin δ |
| | 76° C. | | | 1.630 | 77.5 | 1.670 |
| | 82° C. | | | 0.614 | 81.1 | 0.622 |
| AFTER RTFOT (135° C.) | | | | | | |
| Mass Change, % (Mass Loss is reported as Negative) | | T 240 | 1.0 max. | −0.811 | | |
| Dynamic Shear (G*/sin δ, 10 rad./sec.), kPa | | T 315 | 2.2 min. | G* | δ | G*/sin δ |
| | 76° C. | | | 3.130 | 66.8 | 3.410 |
| | 82° C. | | | 1.770 | 69.0 | 1.900 |
| PRESSURE AGING RESIDUE (100° C., 300 psi, 20 hr.) | | R 28 | | | | |
| Dynamic Shear (G* · sin δ, 10 rad./sec.), kPa | | T 315 | Report | G* | δ | G* · sin δ |
| | 19° C. | | 5,000 max. | 7,970 | 38.3 | 4,940 |
| | 16° C. | | | 11,500 | 36.8 | 6,870 |
| Creep Stiffness | Stiffness, MPa (60 sec.) | −12° C. | T 313 | 300 max. | 102 | |
| | m Value | | | 0.300 min. | 0.323 | |
| | Stiffness, MPa (60 sec.) | −18° C. | | 300 max. | 198 | |
| | m Value | | | 0.300 min. | 0.297 | |
| 'True' Performance Grade | | | | 79.1-27.3 | | |
| AASHTO M 320 SUPERPAVE ™ Binder Grade, PG: | | | | PG 76-22 | | |

Example 3

A sulfur modified compound has been developed in accordance with embodiments of the present invention that can be used in the road construction. The technology consists of several different unique attributes that provide unique performance properties while using sulfur modified asphalt. The basis for the technology is the incorporation of elemental sulfur into compounds in the weight percents from 20-50 wt. % in conjunction with polyphosphoric acid and saturated polyolefin elastomers. In Experiment C, a base PG 64-28 asphalt modified with 0.5 wt. % 115% PPA, as shown in Table 8, was compared to the same blend with the addition of 50 wt. % sulfur, as shown in Table 9, and 3.5 wt. % Sasobit® wax, in accordance with embodiments of the present invention. The addition of sulfur into this compound provided several unique attributes that could not be obtain economically by other methods. The base PG 64-28 with 0.5 wt. % PPA produced a binder with a PG 64-28 with an effective temperature range of 69.2-31.4, as shown in Table 7. This binder also displayed a Rotational Viscosity of 0.745 Pa-sec. This binder also displayed a high Rotational Viscosity of 1.593 Pa-sec. When this compound was made by blending 50 wt. % sulfur under high shear into the blend and then subsequently modifying, enhanced performance was observed with a 53% reduction in rotational viscosity at 135° C., while improving the effective temperature range to 69.1-30.0 for a PG 64-28 binder, as shown in Table 8. The addition of 3.5 wt. % Sasobit® wax did not show any substantial further decrease in the rotational viscosity.

The resulting properties are significant because a binder having a comparable performance grading typically requires the use of a high percentage of polymer >4 wt. % and the use of a very soft base asphalt to maintain the low temperature properties. In this Example, there is a synergistic reaction between the PPA and sulfur that provides the additional improvement at the low end, while reducing the high temperature rotational viscosity. The compositions and methods of the present invention can lend itself to using modified asphalts in warm mix applications, where it is currently limited by the high viscosity of modified binders. Additionally, using these types of binders in warm mix applications further reduces the possible emissions of $H_2S$.

TABLE 8

PG Determination for Binder C- Base (PG 64-28, w/ 0.5% 115% PPA)

| PROPERTY | | | AASHTO TEST METHOD | SPECIFICATIONS | RESULTS | | |
|---|---|---|---|---|---|---|---|
| ORIGINAL BINDER | | | | | | | |
| Flash Point, ° C. (° F.) | | | T 48 | 230 min. | 271 (520) | | |
| Specific Gravity | | 15.6° C. | T 228 | Report | 1.035 | | |
| Softening Point, ° C. (° F.) | | | ASTM D 36 | Report | 50 (122) | | |
| Penetration (100 grams, 5 sec.), dmm | | 25° C. | T 49 | Report | 70 | | |
| Viscosity, Pa · s | | 135° C. | T 316 | 3.0 max. | 0.690 | | |
| | | 165° C. | | Report | 0.197 | | |
| Separation, R&B Difference, 48 hrs., ° C. (° F.) | | 163° C. | | | | | |
| Top, ⅓, Softening Point, ° C. (° F.) | | | ASTM D 5892 | Report | 52.2 (126.0) | | |
| Bottom, ⅓, Softening Point, ° C. (° F.) | | | | | 51.7 (125.0) | | |
| Difference, ° C. (° F.) | | | | 2 (4) max. | 0.5 (1.0) | | |
| Dynamic Shear (G*/sin δ, 10 rad./sec.), kPa | | | T 315 | 1.0 min. | G* | δ | G*/sin δ |
| | | 64° C. | | | 1.710 | 81.5 | 1.730 |
| | | 70° C. | | | 0.880 | 83.6 | 0.885 |
| AFTER RTFOT @ 135° C. | | | | | | | |
| Mass Change, % (Mass Loss is reported as Negative) | | | T 240 | 1.0 max. | −0.103 | | |
| Dynamic Shear (G*/sin δ, 10 rad./sec.), kPa | | | T 315 | 2.2 min. | G* | δ | G*/sin δ |
| | | 64° C. | | | 2.740 | 77.6 | 2.800 |
| | | 70° C. | | | 1.410 | 79.7 | 1.430 |
| MSCR | 0.1 kPa | % Rec. | 64° C. | TP 70-08 | Report | 24.3 | |
| | | Jnr | | | | 1.80 | |
| | 3.2 kPa | % Rec. | | | | 7.7 | |
| | | Jnr | | | | 2.69 | |
| PRESSURE AGING RESIDUE (100° C., 300 psi, 20 hr.) | | | R 28 | | | | |
| Dynamic Shear (G* · sin δ, 10 rad./sec.), kPa | | | T 315 | Report | G* | δ | G* · sin δ |
| | | 16° C. | | 5,000 max. | 9,050 | 43.3 | 6,200 |
| | | 19° C. | | | 5,840 | 45.6 | 4,170 |
| Creep Stiffness | Stiffness, MPa (60 sec.) | | −18° C. | T 313 | 300 max. | 246 | |
| | m Value | | | | 0.300 min. | 0.322 | |
| | Stiffness, MPa (60 sec.) | | −24° C. | | 300 max. | 465 | |
| | m Value | | | | 0.300 min. | 0.274 | |
| 'True' Performance Grade | | | | | 66.2-29.9 | | |
| AASHTO M 320 SUPERPAVE ™ Binder Grade, PG: | | | | | PG 64-28 | | |

TABLE 9

PG Determination for Binder C- Sulfur
(PG 64-28, w/ 0.5% 115% PPA & 50 wt. % Sulfur)

| PROPERTY | | | AASHTO TEST METHOD | SPECIFICATIONS | RESULTS | | |
|---|---|---|---|---|---|---|---|
| ORIGINAL BINDER | | | | | | | |
| H₂S Emissions, ppm | | | Detector Tubes | Report | After 35 ppm | | |
| Specific Gravity | | 15.6° C. | T 228 | Report | 1.203 | | |
| Softening Point, ° C. (° F.) | | | ASTM D 36 | Report | 68 (154) | | |
| Penetration (100 grams, 5 sec.), dmm | | 25° C. | T 49 | Report | 33 | | |
| Viscosity, Pa · s | | 135° C. | T 316 | 3.0 max. | 0.350 | | |
| Dynamic Shear (G*/sin δ, 10 rad./sec.), kPa | | | T 315 | 1.0 min. | G* | δ | G*/sin δ |
| | | 64° C. | | | 1.680 | 73.1 | 1.760 |
| | | 70° C. | | | 0.878 | 76.0 | 0.905 |
| AFTER RTFOT @ 135° C. | | | | | | | |
| Mass Change, % (Mass Loss is reported as Negative) | | | T 240 | 1.0 max. | −0.822 | | |
| Dynamic Shear (G*/sin δ, 10 rad./sec.), kPa | | | T 315 | 2.2 min. | G* | δ | G*/sin δ |
| | | 76° C. | | | 3.300 | 76 | 3.400 |
| | | 82° C. | | | 1.670 | 79.1 | 1.700 |
| MSCR | 0.1 kPa | % Rec. | 64° C. | TP 70-08 | Report | 53.2 | |
| | | Jnr | | | | 0.03 | |
| | 3.2 kPa | % Rec. | | | | 16.4 | |
| | | Jnr | | | | 0.11 | |
| PRESSURE AGING RESIDUE (100° C., 300 psi, 20 hr.) | | | R 28 | | | | |
| Dynamic Shear (G* · sin δ, 10 rad./sec.), kPa | | | T 315 | Report | G* | δ | G* · sin δ |
| | | 19° C. | | 5,000 max. | 11,500 | 36.4 | 6,830 |
| | | 22° C. | | | 8,120 | 37.8 | 4,980 |
| Creep Stiffness | Stiffness, MPa (60 sec.) | | −18° C. | T 313 | 300 max. | 86 | |
| | m Value | | | | 0.300 min. | 0.321 | |
| | Stiffness, MPa (60 sec.) | | −24° C. | | 300 max. | 266 | |
| | m Value | | | | 0.300 min. | 0.262 | |
| 'True' Performance Grade | | | | | 69.1-30.0 | | |
| AASHTO M 320 SUPERPAVE ™ Binder Grade, PG: | | | | | 64-28 | | |

Example 4

A sulfur modified compound has been developed in accordance with embodiments of the present invention that can be used in the road construction. The technology of the present invention results in several different unique attributes that provide unique performance properties while using sulfur modified asphalt. The basis for the technology is the incorporation of elemental sulfur into compounds in the weight percents from 20-50 wt. % in conjunction with polyphosphoric acid and saturated polyolefin elastomers.

In Experiment D, base PG 64-22 asphalt modified with 1.5 wt. % Elvaloy® polymer (see Table 10) was compared to the same blend with the addition of 20 wt. % sulfur (see Table 11) and 3.5 wt. % Sasobit® wax in accordance with embodiments of the present invention (see Table 12). The addition of sulfur into this compound provided several unique attributes that could not be obtain economically by other methods. The base PG 64-22 with 1.5 wt. % Elvaloy® polymer produced a binder with a PG 64-28 with an effective temperature range of 64.2-27.7 (see Table 10). This binder also displayed a Rotational Viscosity of 0.590 Pa-sec. When this compound was made by blending 20 wt. % sulfur under high shear into the blend and then subsequently modifying, enhanced performance was observed with a large reduction in rotational viscosity at 135 C, while improving the effective temperature range to 69.4-28.2 for a PG 64-28 binder (see Table 11). The addition of 3.5 wt. % Sasobit® wax in accordance with embodiments of the present invention did show a further decrease in the rotational viscosity (see Table 12). The addition of 3.5 wt. % Sasobit® wax further dropped the rotational viscosity to 0.228 Pa-sec. The effective binder grade was 79.8-22.2. This binder showed an increase in the high temperature side, while further lowering the rotational viscosity making it an ideal binder for warm mix applications.

The resulting properties are significant because a binder having a comparable performance grading typically requires the use of a high percentage of polymer >4 wt. % and the use of a very soft base asphalt to maintain the low temperature properties. In this case, there is a synergistic reaction between the PPA and sulfur that provides the additional improvement at the low end, while reducing the high temperature rotational viscosity. The compositions and methods of the present invention can result in the modified asphalt compositions being used in warm mix applications, where it is currently limited by the high viscosity of modified binders. Furthermore, using these types of binders in warm mix applications further reduces the possible emissions of $H_2S$.

TABLE 10

PG Determination of Base Binder D (PG 64-22, 1.5 wt. % Elvaloy)

| PROPERTY | | AASHTO TEST METHOD | SPECIFICATIONS | RESULTS | | |
|---|---|---|---|---|---|---|
| ORIGINAL BINDER | | | | | | |
| Flash Point, °C. (°F.) | | T 48 | 230 min. | 318 (604) | | |
| Specific Gravity | 15.6° C. | T 228 | Report | 1.032 | | |
| Softening Point, °C. (°F.) | | ASTM D 36 | Report | 51 (124) | | |
| Penetration (100 grams, 5 sec.), dmm | 25° C. | T 49 | Report | 85 | | |
| Viscosity, Pa·s | 135° C. | T 316 | 3.0 max. | 0.590 | | |
| | 165° C. | | Report | 0.171 | | |
| Separation, R&B Difference, 48 hrs., °C. (°F.) | 163° C. | | | | | |
| Top, ⅓, Softening Point, °C. (°F.) | | ASTM D 5892 | Report | 52.4 (126.25) | | |
| Bottom, ⅓, Softening Point, °C. (°F.) | | | | 52.4 (126.25) | | |
| Difference, °C. (°F.) | | | 2 (4) max. | 0.0 (0.0) | | |
| Dynamic Shear (G*/sin δ, 10 rad./sec.), kPa | | T 315 | 1.0 min. | G* | δ | G*/sin δ |
| | 64° C. | | | 1.420 | 85.8 | 1.420 |
| | 70° C. | | | 0.711 | 87.1 | 0.711 |
| AFTER RTFOT @ 135° C. | | | | | | |
| Mass Change, % (Mass Loss is reported as Negative) | | T 240 | 1.0 max. | −0.006 | | |
| Dynamic Shear (G*/sin δ, 10 rad./sec.), kPa | | T 315 | 2.2 min. | G* | δ | G*/sin δ |
| | 64° C. | | | 2.220 | 83.6 | 2.240 |
| | 70° C. | | | 1.090 | 85.1 | 1.100 |
| MSCR  0.1 kPa  % Rec. | 64° C. | TP 70-08 | Report | 11.5 | | |
| Jnr | | | | 3.19 | | |
| 3.2 kPa  % Rec. | | | | 1.9 | | |
| Jnr | | | | 4.00 | | |
| PRESSURE AGING RESIDUE (100° C., 300 psi, 20 hr.) | | R 28 | | | | |
| Dynamic Shear (G* · sin δ, 10 rad./sec.), kPa | | T 315 | Report | G* | δ | G* · sin δ |
| | 19° C. | | 5,000 max. | 7,160 | 46.2 | 5,170 |
| | 25° C. | | | 2,780 | 52.5 | 2,180 |
| Creep Stiffness  Stiffness, MPa (60 sec.) | −12° C. | T 313 | 300 max. | 169 | | |
| m Value | | | 0.300 min. | 0.356 | | |
| Stiffness, MPa (60 sec.) | −18° C. | | 300 max. | 309 | | |
| m Value | | | 0.300 min. | 0.299 | | |
| 'True' Performance Grade | | | | 64.2-27.7 | | |
| AASHTO M 320 SUPERPAVE™ Binder Grade, PG: | | | | PG 64-22 | | |

TABLE 11

PG Determination of Base Binder D - Sulfur (PG 64-22, 1.5 wt. % Elvaloy & 20 wt. % Sulfur)

| PROPERTY | | AASHTO TEST METHOD | SPECIFICATIONS | RESULTS | | |
|---|---|---|---|---|---|---|
| ORIGINAL BINDER | | | | | | |
| H2S Emissions, ppm | | Detector Tubes | Report | 0.0 ppm Before, 21 ppm After | | |
| Specific Gravity | 15.6° C. | T 228 | Report | 1.073 | | |
| Softening Point, °C. (°F.) | | ASTM D 36 | Report | 65 (149) | | |
| Penetration (100 grams, 5 sec.), dmm | 25° C. | T 49 | Report | 62 | | |
| Viscosity, Pa·s | 135° C. | T 316 | 3.0 max. | 0.295 | | |
| Dynamic Shear (G*/sin δ, 10 rad./sec.), kPa | | T 315 | 1.0 min. | G* | δ | G*/sin δ |
| | 64° C. | | | 2.210 | 84.4 | 2.220 |
| | 70° C. | | | 1.120 | 85.7 | 1.120 |
| | 76° C. | | | 0.562 | 86.7 | 0.563 |
| AFTER RTFOT @ 135° C. | | | | | | |
| Mass Change, % (Mass Loss is reported as Negative) | | T 240 | 1.0 max. | −0.743 | | |
| Dynamic Shear (G*/sin δ, 10 rad./sec.), kPa | | T 315 | 2.2 min. | G* | δ | G*/sin δ |
| | 64° C. | | | 3.680 | 73.8 | 3.830 |
| | 70° C. | | | 1.970 | 73.1 | 2.060 |

TABLE 11-continued

PG Determination of Base Binder D - Sulfur (PG 64-22, 1.5 wt. % Elvaloy & 20 wt. % Sulfur)

| PROPERTY | | | | AASHTO TEST METHOD | SPECIFICATIONS | RESULTS | | |
|---|---|---|---|---|---|---|---|---|
| MSCR | 0.1 kPa | % Rec. | 64° C. | TP 70-08 | Report | 10.7 | | |
| | | Jnr | | | | 6.84 | | |
| | 3.2 kPa | % Rec. | | | | 1.30 | | |
| | | Jnr | | | | 9.85 | | |
| PRESSURE AGING RESIDUE (100° C., 300 psi, 20 hr.) | | | | R 28 | | | | |
| Dynamic Shear (G* · sin δ, 10 rad./sec.), kPa | | | | T 315 | Report 5,000 max. | G* | δ | G* · sin δ |
| | | | 16° C. | | | 10,300 | 39.2 | 6,540 |
| | | | 19° C. | | | 6,780 | 41.5 | 4,500 |
| | | | 22° C. | | | 4,420 | 43.8 | 3,060 |
| Creep Stiffness | Stiffness, MPa (60 sec.) | | −12° C. | T 313 | 300 max. | 106 | | |
| | m Value | | | | 0.300 min. | 0.356 | | |
| | Stiffness, MPa (60 sec.) | | −18° C. | | 300 max. | 220 | | |
| | m Value | | | | 0.300 min. | 0.303 | | |
| | Stiffness, MPa (60 sec.) | | −24° C. | | 300 max. | 468 | | |
| | m Value | | | | 0.300 min. | 0.234 | | |
| 'True' Performance Grade | | | | | | 69.4-28.2 | | |
| AASHTO M 320 SUPERPAVE ™ Binder Grade, PG: | | | | | | PG 64-28 | | |

TABLE 12

PG Determination of Base Binder D - Sasobit ® wax (PG 64-22, 1.5 wt. % Elvaloy & 20 wt. % Sulfur, 3.5 wt % Sasobit)

| PROPERTY | | AASHTO TEST METHOD | SPECIFICATIONS | RESULTS | | |
|---|---|---|---|---|---|---|
| ORIGINAL BINDER | | | | | | |
| Specific Gravity | 15.6° C. | T 228 | Report | 1.131 | | |
| Viscosity, Pa · s | 135° C. | T 316 | 3.0 max. | 0.228 | | |
| Dynamic Shear (G*/sin δ, 10 rad./sec.), kPa | | T 315 | 1.0 min. | G* | δ | G*/sin δ |
| | 82° C. | | | 0.891 | 57.7 | 1.050 |
| | 88° C. | | | 0.450 | 58.4 | 0.528 |
| AFTER RTFOT (135° C.) | | | | | | |
| Mass Change, % (Mass Loss is reported as Negative) | | T 240 | 1.0 max. | −0.690 | | |
| Dynamic Shear (G*/sin δ, 10 rad./sec.), kPa | | T 315 | 2.2 min. | G* | δ | G*/sin δ |
| | 76° C. | | | 2.730 | 54.8 | 3.350 |
| | 82° C. | | | 1.410 | 55.2 | 1.710 |
| PRESSURE AGING RESIDUE (100° C., 300 psi, 20 hr.) | | R 28 | | | | |
| Dynamic Shear (G* · sin δ, 10 rad./sec.), kPa | | T 315 | Report 5,000 max. | G* | δ | G* · sin δ |
| | 22° C. | | | 7,820 | 4,890 | 54.8 |
| | 19° C. | | | 11,300 | 36.6 | 6,750 |
| Creep Stiffness | Stiffness, MPa (60 sec.) | −12° C. | T 313 | 300 max. | 146 | |
| | m Value | | | 0.300 min. | 0.301 | |
| | Stiffness, MPa (60 sec.) | −18° C. | | 300 max. | 289 | |
| | m Value | | | 0.300 min. | 0.265 | |
| 'True' Performance Grade | | | | 79.8-22.2 | | |
| AASHTO M 320 SUPERPAVE ™ Binder Grade, PG: | | | | PG 76-22 | | |

Example 5

A sulfur modified compound has been developed in accordance with embodiments of the present invention that can be used in road construction. More specifically, the binder described in Example 4 can be used in a warm mix application. Existing warm mix additives can be defined by a wide range of technologies. Sulfur provides a means to use a waste stream material from the sour gas treatment process and refining process to create a warm mix additive.

The PG 64-22 binder with 20 wt. % sulfur, 1.5 wt. % Elvaloy® polymer and 3.5 wt. % Sasobit® wax (as shown in Table 11) was used in a warm mix asphalt mixture. The use of this binder reduced the mixing and compaction temperature versus a conventional mix by 50° F.+. This reduction qualifies the material as a warm mix asphalt composition. Furthermore, the composition had a significantly higher performance grading. Performance tests were subsequently performed on the mix and compared to the mixture using the PG 64-22 control (as shown in Table 10). Several significant findings were observed and are unique with respect to warm mix asphalt. Several issues have been identified with warm mix asphalt related to the tenderness of the mix due to reduced oxidative aging of the binder during processing and greater moisture susceptibility. Results in Table 13 show the Resilient Modulus results. The sulfur modified binder Blend No. 5, which was prepared in accordance with embodiments of the present invention, displayed a higher Resilient Modulus at 40° C. and a lower Resilient Modulus at 5° C. demonstrating the improved performance properties of the mix with this binder. Most Warm Mix binders tend to have reduced the stiffness at high temperatures. The Resilient Modulus results indicated that sulfur modified asphalt mixtures tended to have better low temperatures properties, while the mixture containing the Blend No. 5 also displayed higher stiffness at 40° C.

TABLE 13

Conclusion Summary (Tensile Strength and Resilient Modulus)

| Properties | | Test Method | Control | | Results Blend No. 5 | |
|---|---|---|---|---|---|---|
| Resilient Modulus | | | ksi | MPa | ksi | MPa |
| Resilient Modulus | 5° C. | ASTM D 4123 | 2,217 | 15,286 | 1,733 | 11,947 |
| | 25° C. | | 527 | 3,634 | 520 | 3,589 |
| | 40° C. | | 145 | 996 | 165 | 1,135 |

The resistance to permanent deformation and moisture susceptibility were further emphasized with testing performed on the Hamburg Wheel Track test.

Table 14 shows the results of the Blend No. 5 previously discussed versus the control. Blend No. 5 with the 20 wt. % sulfur/1.5 wt. % Elvaloy® polymer/3.5 wt. % Sasobit® wax performed the best and displayed 50% greater number of passes to maximum displacement.

TABLE 14

Conclusion Summary (Hamburg Wheel Tracking Test)

| Properties | Test Method | Control | Results Blend No. 5 |
|---|---|---|---|
| Compaction Method | AASHTO T 324 | Gytatory Compactor | |
| Maximum Deflection, mm | | 20 | |
| Number of Passes to Failure, Nf, passes | | 11,710 | 17,970 |
| Test Temperature, ° C. | | 52 | |
| Air Voids, % (7.0 +/− 2.0%) | | 6.8/6.6 | 7.1/6.8 |
| Stripping Inflection Point (SIP), Passes | | 7,000 | 9,000 |

The observed results are consistent with the large difference in the maximum high temperature grade of the control and Blend No. 5. The higher the number of passes to reach maximum displacement indicates a mixture less susceptible to permanent deformation and has sufficient binder stiffness and an adequate aggregate structure. These factors have been some of the primary concerns with warm mix asphalt, since the binder exhibits less oxidative aging compared to conventional binders. Because the samples were submerged in a temperature controlled water bath during testing, the potential effects of moisture damage could be assessed. When the displacement versus number of passes shows a change in slope, this is termed a Stripping Inflection Point (SIP). The SIP represents the number of passes that the deformation is caused by moisture damage and not rutting alone.

The Stripping Inflection Point for Blend No. 5 versus the control indicated that it has greater resistance to moisture susceptibility versus the control. The Stripping Inflection Point for the Blend No. 5 was much higher than the control.

Figure 2:
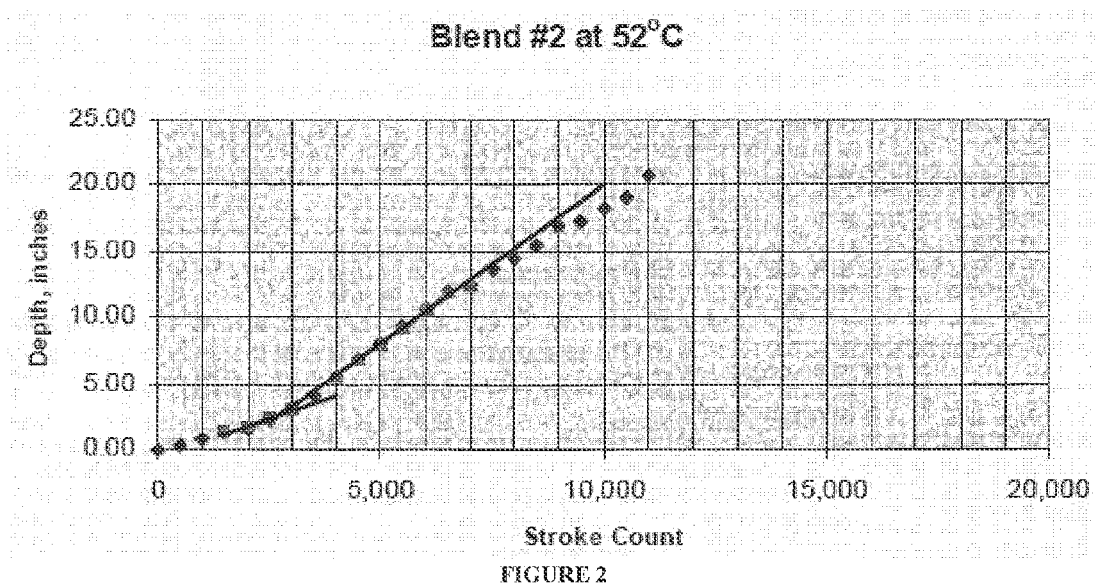
FIG. 2 illustrates the Stroke Count (Passes) versus Depth for the Blend No. 5 at 52° C. made in accordance with embodiments of the present invention.

Another factor that is considered when evaluating binder compositions is the stoke count or passes. FIG. 1 shows the Stoke Count (Passes) versus Depth for the Blend No. 2 at 52° C. FIG. 2 shows the Stoke Count (Passes) versus Depth for the Blend No. 5 at 52° C. Typically values of 10,000 passes are termed very moisture resistant mixes. The Blend No. 5 performed significantly better than the control with respect to the Hamburg Wheel Track testing showing the significant improvement in the rutting resistance. The Blend No. 5 showed 50% more passes required to meet maximum deflection as compared to the control. For Blend No. 5, the sulfur modified mixtures actually increased the SIP versus the control. Not only did the warm mix asphalt mixture display good performance, it improved over the control. It is believed that this unique result has not been previously observed in asphalt compositions containing sulfur.

Warm Mix Blend No. 5 also displayed greater resistance to fuels as compared to the control based on the results in Table 15.

TABLE 15

Resistance of Hot Mix Asphalt to Fuels

| Properties | Test Method | Results Control | Blend No. 5 |
|---|---|---|---|
| Test Temperature | PRI Method | Ambient Temperature | |
| Fuel Used | | Klean-Strip 1-K | |
| | | Kerosene-Product #E08331 | |
| Soak Time, hours | | 24 | |
| Mass Loss after Test, % | | 3.7 | 0.0 |

Several blends were prepared in accordance with embodiments of the present invention, as shown in Table 17. Table 16 displays the effective temperature range of each of the binder compositions as determined by AASHTO M 320, Table 1. The effective temperature range is the maximum and minimum application temperature in degrees Celsius that the binder can effectively operate. Blends No. 2 and No. 5 were evaluated for the warm mix application. These blends showed an increase in the effective temperature range of the binder, while decreasing the rotational viscosity. The other binders either were neutral or decreased the effective temperature range.

TABLE 16

Conclusion Summary (Warm Mix Binders)

| Blend No. (Base Binder) | Viscosity @ 135° C. (Pa-s) Rotational | True Grade (w/o Sasobit ® wax) | True Grade (with Sasobit ® wax) | Temperature Range Effective |
|---|---|---|---|---|
| 1 (A21) | 0.202 | 62.4-28.7 | — | — |
| 2 (B21) | 0.226 | 65.9-34.3 | 79.1-27.3 | 106.4 |

TABLE 16-continued

Conclusion Summary (Warm Mix Binders)

| Blend No. (Base Binder) | Viscosity @ 135° C. (Pa-s) Rotational | True Grade (w/o Sasobit ® wax) | True Grade (with Sasobit ® wax) | Temperature Range Effective |
|---|---|---|---|---|
| 3 (B22) | 0.426 | 69.1-30.0 | — | — |
| 4 (B11) | 0.180 | 59.5-33.8 | — | — |
| 5 (A31) | 0.228 | 69.4-28.2 | 79.8-22.2 | 101.7 |
| 6 (A41) | 0.328 | 73.2-30.3 | 84.7-16.2 | 100.9 |
| 7 (New) | 0.260 | — | 83.6-16.2 | 99.8 |
| 8 (F41) | 0.232 | 64.2-25.9 | 80.7-10.9 | 91.6 |

TABLE 17

Warm Mix Binders

| Blend | Asphalt | Sulfur | PPA | Elvaloy ® polymer | Vamac | SASOBIT ® WAX |
|---|---|---|---|---|---|---|
| Binder A (PG 64-22, Gulf Coast) | | | | | | |
| No. 1 | 77.5 | 20 | 0.5 | — | — | 2.0 |
| No. 5 | 75.0 | 20 | — | 1.5 | — | 3.5 |
| No. 6 | 74.0 | 20 | 0.5 | 1.5 | — | 4.0 |
| No. 7 | 74.5 | 20 | 0.5 | 1.0 | — | 4.0 |
| No. 8 | 74.0 | 20 | 0.5 | — | 2.0 | 3.5 |
| Binder B (PG 64-28, East Coast) | | | | | | |
| No. 2 | 76.0 | 20 | 0.5 | — | — | 3.5 |
| No. 3 | 46.0 | 50 | 0.5 | — | — | 3.5 |
| No. 4 | 78.0 | 20 | — | — | — | 2.0 |

A 12.5 mm Superpave Surface Mix Design was selected with the following aggregate proportions shown in Table 18.

TABLE 18

Aggregate Mix Proportions

| | Design Targets | | | Superpave Surface Mix Design | | | | | |
|---|---|---|---|---|---|---|---|---|---|
| Property | Control Point | Restricted zone | Test Method | Trap Rock No. 8 | Trap Rock No. 12.5 | Trap Rock No. 10 | Trap Rock SD | Combined Passing, % | Actual Passing, % |
| | | | | 26% | 38% | 29% | 7% | 100% | |
| | | | | Proportion | | | | | |
| 3/4" | | | T 27 | 100 | 100 | 100 | 100 | 100.0 | 100.0 |
| 1/2" | 90-100 | | | 82.7 | 100 | 100 | 100 | 95.5 | 96.0 |
| 3/8" | 90 max. | | | 51.9 | 96.3 | 100 | 100 | 86.1 | 86.0 |
| No. 4 | | | | 11.2 | 36.2 | 98.4 | 98.3 | 52.1 | 53.0 |
| No. 8 | 28-58 | | | 5.0 | 10.9 | 69.2 | 94.9 | 32.2 | 33.0 |
| No. 16 | | | | 4.1 | 6.7 | 47.0 | 85.7 | 23.2 | 24.0 |
| No. 30 | | | | 3.7 | 5.5 | 34.8 | 67.3 | 17.8 | 18.0 |
| No. 50 | | | | 3.3 | 4.8 | 25.7 | 30.6 | 12.3 | 12.0 |
| No. 100 | | | | 2.7 | 4.1 | 18.1 | 5.1 | 7.9 | 8.0 |
| No. 200 | 2-10 | | | 2.0 | 3.3 | 12.6 | 1.4 | 5.5 | 5.5 |

The volumetric properties were based on Optimum Asphalt Content for control PG 64-22. These properties produced the following volumetrics as shown in Table 19.

TABLE 19

Volumetric Properties at Optimum Asphalt Content

| Property | Specification | Test Method | Results |
|---|---|---|---|
| Optimum Asphalt Content, % | — | | 5.0 |
| % $G_{mm}$ @ $N_{ini*}$ | ≤89% | | 86 |
| % $G_{mm}$ @ $N_{desgn}$ | 96% | M 323 | 96 |
| % $G_{mm}$ @ $N_{max}$ | <98% | (Calculation) | 97.5 |
| VMA @ $N_{desgn}$ | 14 min | | 14.1 |
| VFA @ $N_{desgn}$ | 65-75 | | 72.3 |

The optimum asphalt content for the control mix was 5.0% % and then the Theoretical Maximum Specific Gravity (Gmm) was determine to be 2.704. This coupled with the Bulk Specific Gravity using an I·$N_{design}$=100 gyrations was 2.594.

Table 20 displays the Warm Mix Asphalt mix design information for the control (PG 64-22), Warm Mix Sulfur Asphalt (WMSA) with Blend No. 2 and WMSA with Blend No. 5. The table displays the volumetrics of the different mixes at an optimum asphalt binder content of 5%, compacted with N100 Design Gyrations. Based on the differences in each binder, there was some variation in the volumetrics obtained. The WMSA was able to be compacted at 50° F.+ below the conventional mixture.

TABLE 20

Conclusion Summary (Warm Mix Asphalt Mixtures)

| Properties | Control | Blend No. 2 | Blend No. 5 |
|---|---|---|---|
| Design Gyrations | 100 | — | — |
| Mixing Temperature, °F. | 311 | 250 | 250 |
| Compaction Temperature, °F. | 291 | 240 | 240 |
| Percent Aggregate, Ps (%) | 95.0 | 95.0 | 95.0 |
| Percent Binder, Pb (%) | 5.00 | 5.00 | 5.00 |
| Gb | 1.035 | 1.139 | 1.131 |
| Gse | 2.945 | 2.992 | 2.987 |
| Gsb | 2.871 | 2.871 | 2.871 |
| Pba | 0.9 | 1.6 | 1.5 |
| Pbe | 4.1 | 3.5 | 3.5 |
| P0.075 | 6.3 | 6.3 | 6.3 |
| Gmm | 2.695 | 2.732 | 2.728 |
| Gmb | 2.593 | 2.606 | 2.582 |
| Va, % | 3.8 | 4.6 | 5.4 |
| VMA | 14.2 | 13.8 | 14.6 |
| VFA | 73.3 | 66.5 | 63.2 |
| DP | 1.5 | 1.8 | 1.8 |

Based on the selection of Blend No. 2 (PG 64-28/20 wt. % Sulfur/0.5 wt. % PPA/3.5 wt. % Sasobit® wax) and Blend No. 5 (PG 64-22/20 wt. % Sulfur/0.5 wt. % Elvaloy® polymer/3.5 wt. % Sasobit® wax) several asphalt mixtures were successfully prepared. During preparation of the binder compositions used in the examples, essentially no $H_2S$ was detected during the mixing or compaction process.

As indicated previously, the embodiments of the current invention include a set of components in levels not previously used to develop and produce a lower total material cost, high performance asphalt binder that can also be used in warm mix asphalt applications. In hot mix asphalt applications, mixes are generally heated to 300° F. (149° C.) or greater, depending mainly on the type of binder used. When asphalt mixes can be produced at temperatures of about 250° F. (121° C.) or lower it results fuel cost savings and findings have shown that lower plant temperatures can lead to a 30 percent reduction in fuel energy consumption. Thus, lower asphalt mixing temperatures also results in lower emissions, either visible or invisible, that may contribute to health, odor problems, or lower greenhouse gas emissions. The decrease in emissions potentially represents a significant cost savings, considering that 30-50 percent of overhead costs at an asphalt plant can be attributed to emission control.

Further advantages of the present invention include the feature of the low temperature reaction of sulfur and Elvaloy® polymer in asphalt binders resulting in improved stiffness. Another advantage is that polyphosphoric acid and sulfur modified asphalt binders can be used to produce a binder with reduced high temperature rotational viscosity without reduction in the original dynamic shear properties. Furthermore, polyphosphoric acid and sulfur modified asphalt compounds can be used to produce a binder with improved low temperature properties.

The addition of polyphosphoric acid and sulfur modified compounds, as used in embodiments of the present invention, provide improved resistance to aging based on the Pressure Aging Vessel residue at various temperatures.

Embodiments of the present invention provide for the use of any saturated polymer having backbone macromolecules (ethylene, propylene, butylenes, etc.) with macromolecular modifications (co-polymer, ter-polymer, graft-block co or ter-polymer (random, alternating, block, graft-block that can contain reactive functionality)) in a range of about 0 to about 5 wt. % in the presence of large loading of sulfur. Embodiments of the present invention also allow for the addition of a saturated polyolefin to a sulfur modified asphalt in the presence of polyphosphoric acid.

The use of Polyphosphoric acid and special fine crystalline long chain aliphatic hydrocarbons (such as Sasobit™ wax) in sulfur modified asphalt binders in accordance with embodiments of the present invention allow a binder to be produced with reduced high temperature rotational viscosity with an increase in the Original Dynamic Shear properties.

The use of Polyphosphoric acid and special fine crystalline long chain aliphatic hydrocarbons (such as Sasobit™ wax) in sulfur modified asphalt binders in accordance with embodiments of the present invention allow a binder to be produced with improved high temperature properties.

Embodiments of the present invention allow for the use of any saturated polyolefin (ethylene, propylene, butylenes, etc.) and saturated backbone macromolecules (ethylene, propylene, butylenes, etc.) with macromolecular modifications (co-polymer, ter-polymer, graft-block co or ter-polymer (random, alternating, block, graft-block that can contain reactive functionality)) in the presence of large loading of sulfur and Sasobit® wax.

The binders developed in accordance with embodiments of the present invention have excellent flow properties at high temperatures for applications in warm mix asphalts. These warm mix binders displayed significantly higher Performance Grades than the base PG 64-22 and no issues were observed in the preparation of the Warm Mix Asphalt.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

That which is claimed is:

1. A highly loaded sulfur-modified asphalt binder composition for use with asphalt concrete for improved properties relative to high temperature rotational viscosity without a reduction in dynamic shear properties, the asphalt binder comprising:
   a. a polyphosphoric acid present in a range of up to 2 wt. % of the asphalt binder composition;
   b. a macromolecular polymer having a saturated backbone with macromolecular modifications being present in a range up to 5 wt. % of the asphalt binder composition;
   c. sulfur, the sulfur being present in a range of about 20 wt. % to about 50 wt. % of the binder composition, where the amount of sulfur being effective to at least partially emulsify in the composition;

d. non-surfactant additives based on wax chemistry being present in an amount sufficient to provide a lubricating effect on the asphalt binder composition; and e. bitumen.

2. The of the asphalt binder composition of claim 1 where the non-surfactant additives based on wax chemistry is present in a range up to 10 wt. % of the asphalt binder composition.

3. The of the asphalt binder composition of claim 1 where the bitumen is present in a range of 50 wt. % to 90 wt. % of the asphalt binder composition.

4. The asphalt binder composition of claim 1 where the asphalt binder composition has a Dynamic Shear in a range of 1000 G*·sin δ to 5000 G*·sin δ at 28° C.

5. The asphalt binder composition of claim 1 where the sulfur is present in an amount of 20 wt. %, the polyphosphoric acid is present in an amount of 0.5 wt. % and the non-surfactant additives based on wax chemistry is present in an amount of 3.5 wt. % in the asphalt binder composition, and the asphalt binder composition is PG graded as 64-28.

6. The of the asphalt binder composition of claim 1 where the sulfur is present in an amount of 20 wt. %, the macromolecular polymer having the saturated backbone with macromolecular modifications is present in an amount of 1.5 wt. % and the non-surfactant additives based on wax chemistry is present in an amount of 3.5 wt. % in the asphalt binder composition, and the asphalt binder composition is PG graded as 64-22.

7. The asphalt binder of claim 1 where the asphalt binder has a rotational viscosity in a range of 0.100 Pa·s to 0.300 Pa·s at about 135° C.

8. The asphalt binder composition of claim 1 where the pressure aged residue of the asphalt binder has a Dynamic Shear in a range of 1000 kPa to 5000 kPa at 22° C.

9. The asphalt binder composition of claim 1 where the asphalt binder has a rotational viscosity in a range of 0.100 Pa·s to 0.350 Pa·s at 135° C.

10. The asphalt binder composition of claim 1 where the asphalt binder has a temperature effective range high temperature value that is greater than 80° C.

11. The asphalt binder composition of claim 1 where the asphalt binder has a Performance Grade of 82-16.

12. The asphalt binder composition of claim 1 where the asphalt binder has a temperature effective range that is greater than 99° C.

13. The asphalt binder composition of claim 1 where the asphalt binder comprises asphalt in an amount of 74.0 wt. %, sulfur in an amount of 20 wt. % and polymer in an amount of 1.5 wt. % of the asphalt binder composition, where the asphalt binder composition has a rotational viscosity that is greater than 0.300 Pa·s at 135° C., and where the asphalt binder has a temperature effective range that is greater than 100° C.

14. A method of preparing an asphalt concrete composition having high sulfur load with improved properties relative to high temperature rotational viscosity without a reduction in dynamic shear properties, the method comprising the steps of:

a. preparing an asphalt binder, where the asphalt binder comprises:

(1) a polyphosphoric acid present in an amount effective to increase stiffness at lower mixing temperatures, (2) a macromolecular polymer having a saturated backbone with macromolecular modifications present in an amount effective to increase viscosity of the composition so that it can be used in warm mix applications, (3) sulfur present in loadings ranging from 20 wt. % to 50 wt. % of the asphalt binder, where the amount of sulfur is effective to at least partially emulsify in the composition, (4) non-surfactant additives based on wax chemistry, the non-surfactant additives based on wax chemistry being present in an amount sufficient to provide a lubricating effect on the composition, and (5) bitumen; and b. combining the asphalt binder with aggregate such that the asphalt concrete is produced.

15. The method of claim 14 where the non-surfactant additives based on wax chemistry is present in a range up to 10 wt. % of the asphalt binder.

16. The method of claim 14 where the bitumen is present in a range of 50 wt. % to 90 wt. % of the asphalt binder.

17. The method of claim 14 where the aggregate and the asphalt binder are present in a ratio of 95 parts to 5 parts each by weight of the total of the asphalt concrete.

18. The method of claim 14 where the asphalt binder has a Dynamic Shear in a range of 1000 G*·sin δ to 5000 G*·sin δ at 28° C.

19. The method of claim 14 where the sulfur is present in an amount of 20 wt. %, the polyphosphoric acid is present in an amount of 0.5 wt. % and the non-surfactant additives based on wax chemistry is present in an amount of 3.5 wt. % in the asphalt binder, and the asphalt binder is PG graded as 64-28.

20. The method of claim 14 where the sulfur is present in an amount of about 20 wt. %, the macromolecular polymer having a saturated backbone with macromolecular modifications is present in an amount of about 1.5 wt. % and the non-surfactant additives based on wax chemistry is present in an amount of about 3.5 wt. % in the asphalt binder, and the asphalt binder is PG graded as 64-22.

21. The method of claim 14 where the asphalt binder has a rotational viscosity in a range of 0.100 Pa·s to 0.300 Pa·s at 135° C.

22. The method of claim 14 where the pressure aged residue of the asphalt binder has a Dynamic Shear in a range of 1000 kPa to 5000 kPa at 22° C.

23. The method of claim 14 where the asphalt binder has a rotational viscosity in a range of 0.100 Pa·s to 0.350 Pas at 135° C.

24. The method of claim 14 where the asphalt binder has a temperature effective range high temperature value that is greater than 80° C.

25. The method of claim 14 where the asphalt binder has a Performance Grade of 82-16.

26. The method of claim 14 where the asphalt binder has a temperature effective range that is greater than 99° C.

27. The method of claim 14 where the asphalt binder comprises asphalt in an amount of 74.0 wt. %, sulfur in an amount of 20 wt. %, and polymer being present in an amount of 1.5 wt. % of the asphalt binder comprises, where the asphalt binder has a rotational viscosity that is greater than 0.300 Pa·s at 135° C., and where the asphalt binder has a temperature effective range that is greater than 100° C.

* * * * *